US010346550B1

(12) United States Patent
Botta et al.

(10) Patent No.: US 10,346,550 B1
(45) Date of Patent: Jul. 9, 2019

(54) METHODS AND SYSTEMS FOR SEARCHING AND INDEXING VIRTUAL ENVIRONMENTS

(71) Applicant: X1 Discovery, Inc., Pasadena, CA (US)

(72) Inventors: Brent Botta, Livermore, CA (US);
Stuart Bray, San Francisco, CA (US);
Roland Vilett, Eugene, OR (US);
Todmund Cole, Pasadena, CA (US)

(73) Assignee: X1 Discovery, Inc., Pasadena, CA (US)

( * ) Notice: Subject to any disclaimer, the term of this patent is extended or adjusted under 35 U.S.C. 154(b) by 571 days.

(21) Appl. No.: 14/838,230

(22) Filed: Aug. 27, 2015

Related U.S. Application Data

(60) Provisional application No. 62/043,295, filed on Aug. 28, 2014.

(51) Int. Cl.
*G06F 17/30* (2006.01)

(52) U.S. Cl.
CPC .... *G06F 17/30321* (2013.01); *G06F 17/3053* (2013.01); *G06F 17/30106* (2013.01); *G06F 17/30867* (2013.01)

(58) Field of Classification Search
CPC ......... G06F 17/30321; G06F 17/30106; G06F 17/3053; G06F 17/30867; G06F 17/30554
(Continued)

(56) References Cited

U.S. PATENT DOCUMENTS 5,111,398 A 5/1992 Nunberg et al.
5,202,982 A 4/1993 Gramlich
(Continued)

FOREIGN PATENT DOCUMENTS

WO WO 9847264 A1 10/1998
WO WO 99/01802 1/1999
(Continued)

OTHER PUBLICATIONS

Barth, Steve, "Personal Toolkit: Navigating Information and Ideas," KMWorld Apr. 2003, vol. 12, Issue 4; printed from http://www.kmworld.com/publications/magazine/index.cfm?action=readarticle&Article_id+1505&publication_id=1.
(Continued)

*Primary Examiner* — Hosain T Alam
*Assistant Examiner* — Nicholas E Allen
(74) *Attorney, Agent, or Firm* — Knobbe, Martens, Olson & Bear LLP

(57) ABSTRACT

Methods and systems for generating search indexes in a virtual desktop environment are disclosed. An initial index generation module is configured to generate initial iterations of search indexes for a plurality of users associated with respective virtual desktops and store the initial iterations of search indexes on a shared data store. An incremental search indexing module is configured to update existing iterations of search indexes associated with the plurality of users according to respective schedules. A search processing module is configured to receive a search query from a first user while the first user is logged into the first virtual desktop, identify, utilizing an iteration of the search index associated with a first user and stored on the server storing search indexes for the plurality of users associated with respective virtual desktops, matching documents, and to cause search results corresponding to the matching documents to be presented via the first virtual desktop.

30 Claims, 19 Drawing Sheets

(58) Field of Classification Search
USPC ........................................................ 707/723
See application file for complete search history.

(56) References Cited

U.S. PATENT DOCUMENTS

| | | |
|---|---|---|
| 5,303,361 A | 4/1994 | Colwell et al. |
| 5,659,732 A | 8/1997 | Kirsch |
| 5,671,426 A | 9/1997 | Armstrong, III |
| 5,692,173 A | 11/1997 | Chew |
| 5,704,060 A | 12/1997 | Del Monte |
| 5,704,560 A | 1/1998 | Wimmer |
| 5,717,923 A | 2/1998 | Dedrick |
| 5,721,897 A | 2/1998 | Rubinstein |
| 5,724,424 A | 3/1998 | Gifford |
| 5,724,521 A | 3/1998 | Dedrick |
| 5,724,524 A | 3/1998 | Hunt et al. |
| 5,748,954 A | 5/1998 | Mauldin |
| 5,752,238 A | 5/1998 | Dedrick |
| 5,754,938 A | 5/1998 | Herz et al. |
| 5,754,939 A | 5/1998 | Herz et al. |
| 5,768,521 A | 6/1998 | Dedrick |
| 5,778,361 A | 7/1998 | Nanjo et al. |
| 5,794,210 A | 8/1998 | Goldhaber et al. |
| 5,819,273 A | 10/1998 | Vora et al. |
| 5,826,241 A | 10/1998 | Stein et al. |
| 5,832,208 A | 11/1998 | Chen et al. |
| 5,835,087 A | 11/1998 | Herz et al. |
| 5,848,397 A | 12/1998 | Marsh et al. |
| 5,848,407 A | 12/1998 | Ishikawa et al. |
| 5,852,820 A | 12/1998 | Burrows |
| 5,855,008 A | 12/1998 | Goldhaber et al. |
| 5,864,845 A | 1/1999 | Voorhees et al. |
| 5,864,846 A | 1/1999 | Voorhees et al. |
| 5,903,882 A | 5/1999 | Asay et al. |
| 5,907,837 A | 5/1999 | Ferrel et al. |
| 5,918,014 A | 6/1999 | Robinson |
| 5,920,854 A | 7/1999 | Kirsch et al. |
| 5,920,859 A | 7/1999 | Li |
| 5,951,731 A | 9/1999 | Tsunetomo et al. |
| 6,006,225 A | 12/1999 | Bowman |
| 6,029,195 A | 2/2000 | Herz |
| 6,035,325 A | 3/2000 | Potts |
| 6,070,158 A | 5/2000 | Kirsch et al. |
| 6,073,133 A | 6/2000 | Chrabaszcz |
| 6,078,866 A | 6/2000 | Buck et al. |
| 6,085,193 A | 7/2000 | Malkin et al. |
| 6,112,172 A | 8/2000 | True et al. |
| 6,182,068 B1 | 1/2001 | Culliss |
| 6,216,122 B1 | 4/2001 | Elson |
| 6,269,361 B1 | 7/2001 | Davis et al. |
| 6,330,567 B1 | 12/2001 | Chao |
| 6,366,923 B1 | 4/2002 | Lenk et al. |
| 6,421,675 B1 | 7/2002 | Ryan et al. |
| 6,496,820 B1 | 12/2002 | Tada et al. |
| 6,513,028 B1 | 1/2003 | Lee |
| 6,564,213 B1 | 5/2003 | Ortega et al. |
| 6,606,304 B1 | 8/2003 | Grinter et al. |
| 6,615,237 B1 | 9/2003 | Kyne et al. |
| 6,638,314 B1 | 10/2003 | Meyerzon |
| 6,665,668 B1 | 12/2003 | Sugaya et al. |
| 6,700,591 B1 | 3/2004 | Sharpe |
| 6,704,747 B1 | 3/2004 | Fong |
| 6,711,565 B1 | 3/2004 | Subramaniam et al. |
| 6,751,603 B1 | 6/2004 | Bauer et al. |
| 6,757,713 B1 | 6/2004 | Ogilvie et al. |
| 6,826,594 B1 | 11/2004 | Pettersen |
| 6,847,959 B1 | 1/2005 | Arrouye et al. |
| 6,862,713 B1 | 3/2005 | Kraft et al. |
| 6,873,982 B1 | 3/2005 | Bates et al. |
| 6,904,450 B1 | 6/2005 | King et al. |
| 6,961,731 B2 | 11/2005 | Holbrook |
| 7,035,903 B1 | 4/2006 | Baldonado |
| 7,047,502 B2 | 5/2006 | Petropoulos et al. |
| 7,054,855 B2 | 5/2006 | Basso et al. |
| 7,069,497 B1 | 6/2006 | Desai |
| 7,370,035 B2 | 5/2008 | Gross et al. |
| 7,424,510 B2 | 9/2008 | Gross et al. |
| 7,424,676 B1 | 9/2008 | Carlson |
| 7,496,559 B2 | 2/2009 | Gross et al. |
| 7,571,325 B1 | 8/2009 | Cooley |
| 7,702,636 B1 | 4/2010 | Sholtis |
| 7,707,255 B2 | 4/2010 | Satterfield |
| 7,945,914 B2 | 5/2011 | Hasiuk et al. |
| 8,019,741 B2 | 9/2011 | Gross et al. |
| 8,086,953 B1 | 12/2011 | Gabber |
| 8,260,840 B1* | 9/2012 | Sirota ................... G06F 9/5061 |
| | | 370/216 |
| 8,498,977 B2 | 7/2013 | Gross et al. |
| 8,856,093 B2 | 10/2014 | Gross et al. |
| 2001/0027406 A1 | 10/2001 | Araki et al. |
| 2001/0027450 A1 | 10/2001 | Shinoda |
| 2001/0029508 A1 | 10/2001 | Okada et al. |
| 2001/0039490 A1 | 11/2001 | Verbitsky et al. |
| 2002/0004735 A1 | 1/2002 | Gross |
| 2002/0019679 A1 | 2/2002 | Okada et al. |
| 2002/0055981 A1 | 5/2002 | Spaey et al. |
| 2002/0073078 A1 | 5/2002 | Ku et al. |
| 2002/0083178 A1 | 6/2002 | Brothers |
| 2002/0087408 A1 | 7/2002 | Burnett |
| 2002/0092019 A1 | 7/2002 | Marcus |
| 2002/0111962 A1 | 8/2002 | Crucs |
| 2002/0165707 A1 | 11/2002 | Call |
| 2002/0169763 A1 | 11/2002 | Tada et al. |
| 2002/0178009 A1 | 11/2002 | Firman |
| 2002/0184317 A1 | 12/2002 | Thankachan |
| 2003/0014415 A1 | 1/2003 | Weiss et al. |
| 2003/0037321 A1 | 2/2003 | Bowen |
| 2003/0130993 A1 | 7/2003 | Mendelevitch et al. |
| 2003/0171910 A1 | 9/2003 | Abir |
| 2003/0225764 A1 | 12/2003 | Smith et al. |
| 2003/0227489 A1 | 12/2003 | Arend et al. |
| 2003/0229898 A1 | 12/2003 | Babu et al. |
| 2003/0233419 A1 | 12/2003 | Beringer |
| 2004/0073443 A1 | 4/2004 | Gabrick et al. |
| 2004/0128285 A1 | 7/2004 | Green |
| 2004/0133564 A1 | 7/2004 | Gross et al. |
| 2004/0143564 A1 | 7/2004 | Gross et al. |
| 2004/0143569 A1 | 7/2004 | Gross et al. |
| 2004/0172389 A1 | 9/2004 | Galai et al. |
| 2004/0205514 A1 | 10/2004 | Sommerer |
| 2004/0230891 A1 | 11/2004 | Pravetz |
| 2005/0204191 A1 | 9/2005 | McNally |
| 2005/0223061 A1 | 10/2005 | Auerbach |
| 2005/0256846 A1 | 11/2005 | Zigmond et al. |
| 2006/0064394 A1 | 3/2006 | Dettinger |
| 2006/0095424 A1 | 5/2006 | Petropoulos et al. |
| 2006/0168067 A1 | 7/2006 | Carlson et al. |
| 2006/0195379 A1 | 8/2006 | Abecassis |
| 2006/0195481 A1 | 8/2006 | Arrouye |
| 2006/0224604 A1 | 10/2006 | Landsman |
| 2007/0112783 A1* | 5/2007 | McCreight ........ G06F 17/30864 |
| 2007/0192423 A1 | 8/2007 | Karlson |
| 2007/0226204 A1 | 9/2007 | Feldman |
| 2007/0240035 A1 | 10/2007 | Sthanikam |
| 2008/0034073 A1 | 2/2008 | McCloy |
| 2008/0114731 A1 | 5/2008 | Kumar |
| 2008/0114761 A1 | 5/2008 | Gross et al. |
| 2008/0133487 A1 | 6/2008 | Gross |
| 2008/0141365 A1 | 6/2008 | Soegtrop |
| 2008/0147818 A1 | 6/2008 | Sabo |
| 2008/0208812 A1 | 8/2008 | Quoc |
| 2009/0006332 A1 | 1/2009 | Mowatt et al. |
| 2009/0119268 A1 | 5/2009 | Bandaru |
| 2009/0150363 A1 | 6/2009 | Gross et al. |
| 2009/0222406 A1* | 9/2009 | Allred ............... G06F 17/30908 |
| 2009/0328218 A1 | 12/2009 | Tsurukawa |
| 2010/0023502 A1 | 1/2010 | Marlow |
| 2010/0169320 A1 | 7/2010 | Patnam |
| 2010/0274783 A1 | 10/2010 | Chevalier et al. |
| 2010/0332454 A1* | 12/2010 | Prahlad ............. G06F 17/30082 |
| | | 707/654 |
| 2011/0055177 A1 | 3/2011 | Chakra |
| 2011/0126142 A1 | 5/2011 | Zhou |
| 2011/0182422 A1 | 7/2011 | Anderson |

(56) References Cited

U.S. PATENT DOCUMENTS

| | | | |
|---|---|---|---|
| 2011/0208775 | A1 | 8/2011 | Brette et al. |
| 2011/0252033 | A1 | 10/2011 | Narang |
| 2012/0017178 | A1 | 1/2012 | Mulloy |
| 2012/0197912 | A1 | 8/2012 | Grigsby |
| 2012/0278303 | A1 | 11/2012 | Krishnaprasad et al. |
| 2012/0290555 | A1 | 11/2012 | Wu et al. |
| 2012/0290592 | A1 | 11/2012 | Ishii |
| 2012/0330887 | A1 | 12/2012 | Young |
| 2013/0042083 | A1 | 2/2013 | Mutalik |
| 2013/0166909 | A1 | 6/2013 | Agrawal |
| 2013/0325873 | A1* | 12/2013 | Sitsky .............. G06F 17/30619 707/741 |
| 2013/0326333 | A1 | 12/2013 | Hashmi |
| 2014/0052825 | A1* | 2/2014 | Luecke ................ H04L 67/327 709/219 |
| 2014/0081984 | A1* | 3/2014 | Sitsky .................... G06F 9/505 707/741 |
| 2014/0172783 | A1* | 6/2014 | Suzuki ..................... G06F 8/63 707/609 |
| 2014/0289223 | A1 | 9/2014 | Colwell et al. |
| 2014/0310324 | A1 | 10/2014 | Branton |
| 2014/0317425 | A1* | 10/2014 | Lien ..................... G06F 1/3237 713/320 |
| 2014/0344249 | A1 | 11/2014 | Magistrado |
| 2014/0359411 | A1 | 12/2014 | Botta et al. |
| 2015/0074116 | A1* | 3/2015 | Huang ................ G06F 9/45558 707/741 |
| 2015/0095363 | A1 | 4/2015 | Gross et al. |
| 2015/0112996 | A1* | 4/2015 | Mishra ............. G06F 17/30321 707/741 |
| 2015/0161159 | A1 | 6/2015 | Provenzano |
| 2015/0278764 | A1 | 10/2015 | Patil |

FOREIGN PATENT DOCUMENTS

| | | |
|---|---|---|
| WO | WO 99/39286 | 8/1999 |
| WO | WO 99/48028 | 9/1999 |
| WO | WO 00/16218 | 3/2000 |
| WO | WO 00/41090 | 7/2000 |
| WO | WO 00/67159 | 11/2000 |
| WO | WO 2004/023243 A2 | 3/2004 |

OTHER PUBLICATIONS

Computing Service, Email Addresses in Microsoft Outlook 98, Dec. 5, 2000, pp. 1-3.

Ellison, Carol, "Info to Go," Jun. 30, 2002; printed from http://www.pcmag.com/article2/0,1759,3575,00.asp.

Goodman, Danny, Chapter 14, Section 14.5; "JavaScript & DHTML Cookbook" ISBN: 0-596-00467-2; Publisher: O'Reilly; Print Publication Date Apr. 1, 2003.

Halpin, Jon, "PC Data Finder Goes A-Hunting," Jun. 19, 2001; printed from http://www.pcmag.com/article2/0,4149,144228,00.asp.

http://www2.essex.ac.uk/cs/services/email/addressing2.html—searched on www.waybackmachine.com—Internet Archive Wayback Machine, Search Results for Jan. 1, 1996-Mar. 5, 2007.

International Search Report for PCT/US2003/027241, filed Sep. 3, 2003.

Inverted index, Wikipedia, http://en.wikipedia.org/wiki/Inverted_index; Dec. 12, 2006.

"Lotus Magellan Explorer's Guide," © 1989 Lotus Development Corporation.

"Lotus Magellan Product Information Guide," Circa 1989.

Pogue, David, *Finding Files and Web Sites with Sherlock 2*, MAC OS 9: The Missing Manual, Chapter 15, pp. 257-278, Mar. 30, 2000.

Proximity search (text), Wikipedia, http://en.wikipedia.org/wiki/Proximity_search_%28text%29; Dec. 12, 2006.

Sherman, Chris, "Enfish Tracker Pro," © Jan. 1999; printed from http://www.onlinemag.net/OL1999/sherman1.html.

Shneiderman, B., et al., *Clarifying Search: A User-Interface Framework for Test Searches*, D-Lib Magazine, Jan. 1997.

Shokouhi, Milad, and Si, Luo, Foundations and Trends® in Information Retrieval, vol. 5, No. 1 (2011) 1-102 © 2011, DOI: 10.1561/1500000010.

Stop words, Wikipedia, http://en.wikipedia.org/wiki/Stop_words; Dec. 12, 2006.

Supplementary Search Report for EP 03794539.1, filed Sep. 3, 2003.

\* cited by examiner

METHODS AND SYSTEMS FOR SEARCHING AND INDEXING VIRTUAL ENVIRONMENTS

CROSS-REFERENCE TO RELATED APPLICATIONS

Any and all applications for which a foreign or domestic priority claim is identified in the Application Data Sheet as filed with the present application, are hereby incorporated by reference in their entirety under 37 CFR 1.57.

BACKGROUND

Field of the Invention

The present invention is related to virtual desktops and search indexing.

Description of the Related Art

Conventional search indexes created for personal use (e.g., to be used to search a user's local files and email) are designed to be installed and operated on physical, discrete, hardware such as the user's laptop or desktop computer. The actions required to create an inverted search index for a personal collection of files, emails, and attachment require significant use of computer resources, including processor, volatile memory, and non-volatile memory.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a system configured to generate search indexes, comprising: at least one computing device; an interface configured to communicate with a virtual desktop farm; a non-transitory computer storage medium having stored thereon executable instructions that direct the computing system to implement: a load balancing module configured to distribute indexing processes across multiple servers; a throttling module configured to limit a number of user indexing processes executed by the system and a number of concurrent data scanning operations; an initial index generation module configured to generate initial iterations of search indexes for a plurality of users associated with respective virtual desktops, wherein the initial index generation module is configured to: determine, for a first user associated with a first virtual desktop executed using the virtual desktop farm, if a search index has been generated for the first user; at partly in response to a determination that a search index has not been generated for the first user, begin generation of an initial iteration of a search index for the first user in accordance with the limitation on the number of user indexing processes and with the limitation on the number of concurrent data scanning operations; receive an indication that the first user has logged off the first virtual desktop; continue generating the initial iteration of the search index associated with the first user while the first virtual desktop is shut down; store the initial iteration of the search index associated with the first user on a shared data store that stores search indexes for the plurality of users associated with respective virtual desktops; an incremental search indexing module configured to initiate and perform an update to one or more existing iterations of search indexes associated with the plurality of users according to a schedule, including at least an existing iteration of a search index associated with the first user while the first virtual desktop is shut down; a search processing module configured to receive a search query from the first user while the first user is logged into the first virtual desktop, identify, utilizing an iteration of the search index associated with the first user and stored on the server storing search indexes for the plurality of users associated with respective virtual desktops, matching documents, and to cause search results corresponding to the matching documents to be presented via the first virtual desktop.

An aspect of the disclosure relates to a computer-implemented of method of managing search engine indexing with respect to a virtual desktop architecture, the method comprising: receiving, via a first plurality of virtual desktops, at a virtual resource management system comprising at least a processor device, indexing parameters from a first plurality of users, the indexing parameters identifying data types, or data sources, or both data types and data sources to be indexed; generating, by the virtual resource management system, initial iterations of search indexes for the first plurality of users associated with respective virtual desktops; storing the initial iterations of search indexes on a shared data storage system; generating, by the virtual resource management system, updated iterations of the search indexes on the shared data storage system for at least a portion of the first plurality of users associated with respective virtual desktops; and receiving, by the virtual resource management system, a search query from a first user in the first plurality of users, while the first user is logged into a first virtual desktop, and identifying, utilizing an iteration of the search index associated with the first user and stored on the shared data storage system, matching documents, and causing search results corresponding to the matching documents to be presented via the first virtual desktop, wherein the first user is inhibited from accessing initial or updated iterations of indexes of other users stored on the shared data storage system.

An aspect of the disclosure relates to a system configured to generate search indexes, comprising: at least one computing device; an interface configured to communicate with a virtual desktop farm; a non-transitory computer storage medium having stored thereon executable instructions that direct the computing system to implement: an initial index generation module configured to generate initial iterations of search indexes for a plurality of users associated with respective virtual desktops and store the initial iterations of search indexes on a shared data store; an incremental search indexing module configured to update at least some of existing iterations of search indexes associated with the plurality of users according to respective schedules; a search processing module configured to receive a search query from a first user while the first user is logged into the first virtual desktop, identify, utilizing an iteration of the search index associated with the first user and stored on the server storing search indexes for the plurality of users associated with respective virtual desktops, matching documents, and to cause search results corresponding to the matching documents to be presented via the first virtual desktop, wherein the first user is inhibited from accessing initial or updated iterations of indexes of other users stored on the shared data store.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 11-17 illustrate example user interfaces and reports.

DETAILED DESCRIPTION

Figure 1:
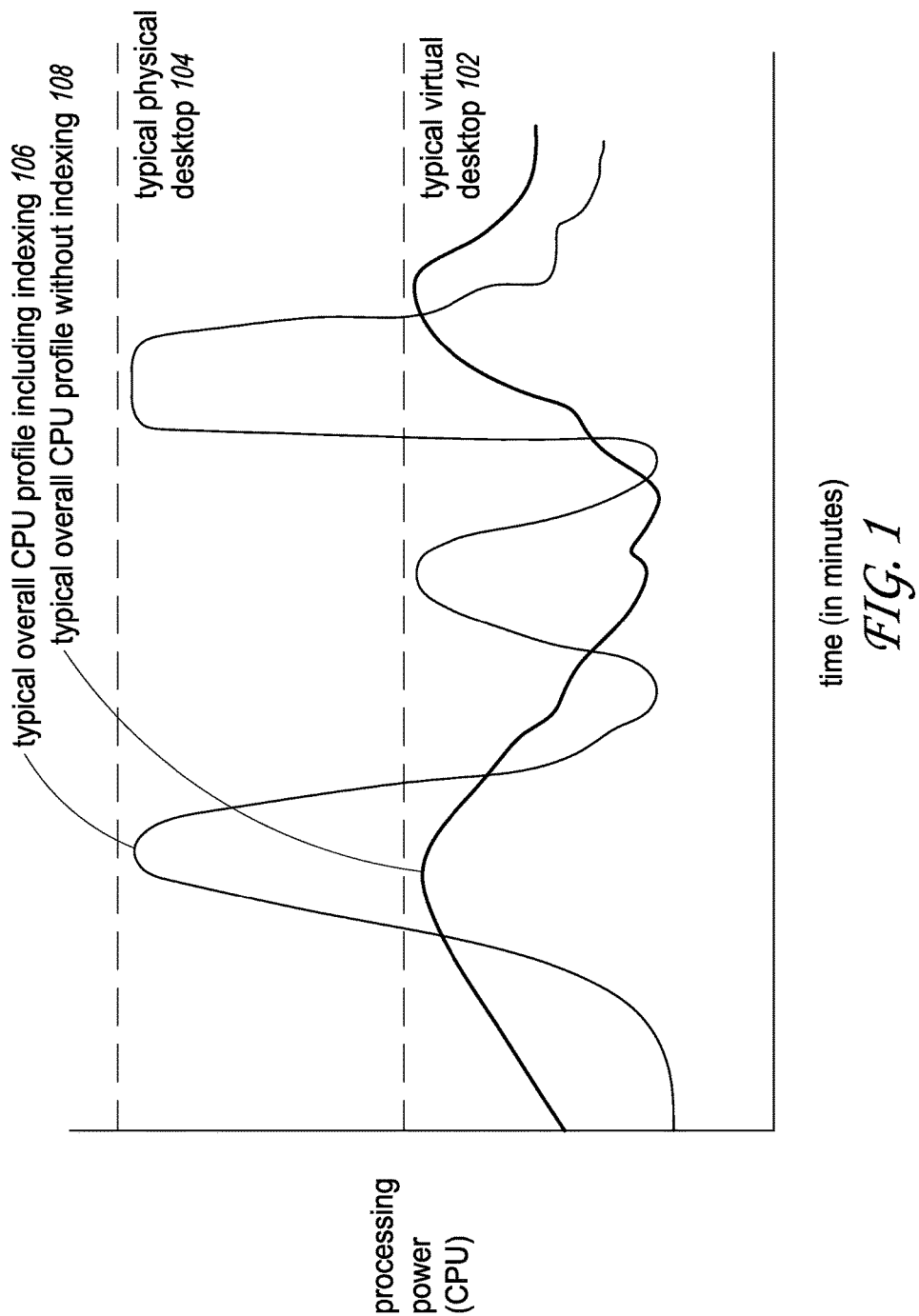
FIG. 1 illustrates example resource utilization profiles.

Example embodiments of methods and systems for generating search indexes for virtual desktops are described. Disclosed embodiments can support numerous types of indexes (e.g., inverted and non-inverted search indexes) including the example embodiments disclosed in U.S. Pat. No. 7,370,035, the content of which is hereby incorporated by reference in its entirety herein. As discussed in greater detail elsewhere herein, the disclosed architecture may provide one or more of the following technical advantages: an enhanced user experience, reduced virtual resource requirements, and/or centralized management of search indexing processes.

A search index may optionally be in the form of an inverted index comprising an index data structure that stores mappings of content (e.g., character strings) to a location in a document (e.g., a word processing document, an email document, a slide presentation, a spreadsheet, a PDF file, a web page, a database file, etc.). Thus, an inverted index may comprise a list of all the unique words/character strings (or normalized versions thereof) that appear in any indexed document, and for each word/character string, the index stores which fields of which documents or files contain that word or character string. An inverted index may be used to quickly resolve a query by jumping to the corresponding word/character string identifier in the inverted index.

As discussed above, conventional search indexes created for personal use are designed to be installed and operated on physical, discrete, hardware such as the user's laptop or desktop computer. The actions required to create an inverted search index for a personal collection of files, emails, and attachment require significant use of computer resources, including processor, volatile memory, and non-volatile memory. Such resources may not be readily available in a virtual desktop environment.

In a typical conventional virtual desktop architecture, the processing power is provided by a centralized server and, to minimize costs, the amount of CPU and memory assigned to each user are often kept at a bare minimum to support only basic computational needs. This reduction in available processing power and memory for a given virtual desktop user creates significant problems with respect to creating a search index for that user, because search indexing processes are typically designed to utilize considerable processing power and memory during index creation in order to reduce the computer resource demands and provide for quick response when processing user queries.

Further, in a typical conventional virtual desktop architecture, the CPU and memory assigned to the user when the user launches a virtual desktop is only assigned to that user when the user is actively using the user's desktop. The resources are no longer allocated to the user once the user is logged off the virtual desktop. Disadvantageously, if no computational resources are assigned on the user's behalf when the user is logged off, there are no computational resources made available to update a search index of the user's files until that user logs back in to the virtual desktop. Thus, when the user log backs in to the user's virtual desktop, the user's search index will often be out-of-date, providing a poor user experience when attempting to search for recent or modified documents. In order to update the search index when the user is logged in to the virtual desktop, significant processing power will be consumed, and such processing power will not be available to the user for other uses while the index is updating.

FIG. 1 illustrates an example of typical processing power available on a physical desktop computer and available to a virtual desktop. To save expense, the amount of processing power allocated for a virtual desktop (see, e.g., example profile 102) is a fraction of the processing power that a physical desktop computer typically possesses (see, e.g., example profile 104). The typical overall processor power utilization profile including indexing load 106 will typically fit within the resources of the CPU of a physical desktop 104, but the processing power available to a virtual desktop 102 may only support a typical overall processor power utilization profile without indexing (see, e.g., example profile 108).

Figure 17:
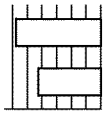

Aspects of the disclosure relate to enhanced architectures configured to perform search indexing processes for a virtual desktop of a user. The indexing process may be configured to run on a central indexing server configured to dynamically utilize resources of the server to respond to the transient demands of the indexing operation. The indexing process may be uniquely bound to the search user interface process (which displays a search user interface including search fields and providing search results) operating directly within the user's virtual desktop, and may prevent a given user from accessing another index (e.g., the index of another user). The index may be created by the indexing server and saved to a centralized network file share that the user's virtual desktop can access. A non-limiting example of a search user interface is illustrated in FIG. 17, which is discussed in greater detail elsewhere herein.

A one-to-one correspondence may be created between an interface process running on the virtual desktop, which may have a small (relative to a physical desktop computer), fixed allocation of resources, and an indexing process executing on an indexing server. The indexing process may be configured to dynamically request and consume significantly more resources on the server. The indexing server may be configured to host a plurality of index processes for a respective plurality of virtual desktops, while concurrently maintaining the plurality of one-to-one correspondences between a given search user interface process and the corresponding indexing process.

Figure 2:
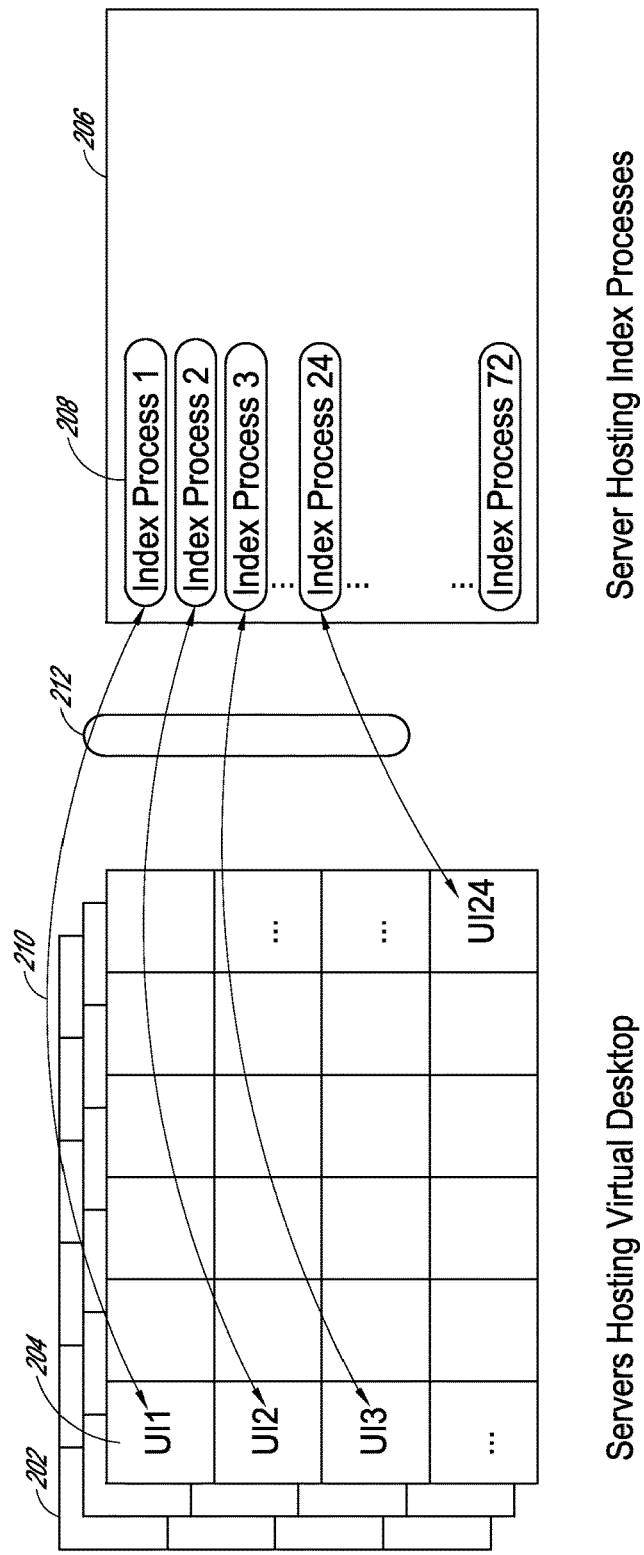
FIG. 2 illustrates an example architecture.

As illustrated in FIG. 2, an illustrative example implementation may include four servers, each with 24 CPU cores and 48 GB of memory (although other quantities of servers and CPUs, and other memory sizes may be used). In this example, three of the four servers (servers 202) are respectively supporting the virtual desktop for 24 users, for a total of 72 virtual desktops for 72 users. In this example, a given user 204 is optionally allocated a fixed and unchanging partition of CPU and memory, for example, 1 CPU core and 2 GB of memory. If a given user's computing needs exceed that capacity, the user will be unable to execute those computing needs and will need to wait until other processes running on that virtual desktop complete. The fourth server 206 is configured to execute an indexing process 208 on behalf of each of those 72 users. The 72 indexing processes 208 may simultaneously execute within a partition (e.g., a single partition). Each indexing process 208 may utilize as much server 206 resources as needed to complete the indexing operation it is performing for a given user. In this example, a given user 204 has a one-to-one correspondence 210 between the user's virtual desktop interface process and the respective indexing process 208. The server 206 enables a plurality of one-to-one correspondences 212 between the indexing processes 208 the server 206 is hosting and the multiple users 204.

By contrast, conventional implementations do not possess this capability. Instead, conventional solutions may attempt to address the challenges posed by virtual desktops using one of the following techniques. One conventional implementation allocates another fixed resource on the user's behalf, which would either be too small a set of resources to perform the necessary operation and result in a longer time to complete the operation, or would be too large a set of resources and result in significant extra expense. Another conventional implementation dynamically adjusts the CPU and memory assigned for each virtual desktop. However, the users' virtual desktops do not communicate with one other and this conventional implementation is unable to satisfactorily handle situations where multiple users simultaneously demand an increase in their allotment of resources and instead causes a situation where resources are over committed. Still another conventional technique offers Software-as-a-Service (SaaS). However, the user interface provided by a conventional SaaS implementation is typically in the form of a simple browser interface that does not provide a deep and rich interaction with the user's local data and operating system. By contrast, the present invention has a user interface that may operate as an executable installed directly within the virtual desktop operating system and therefore possessing access to the files, emails, and data that are local to that user.

Figure 3:
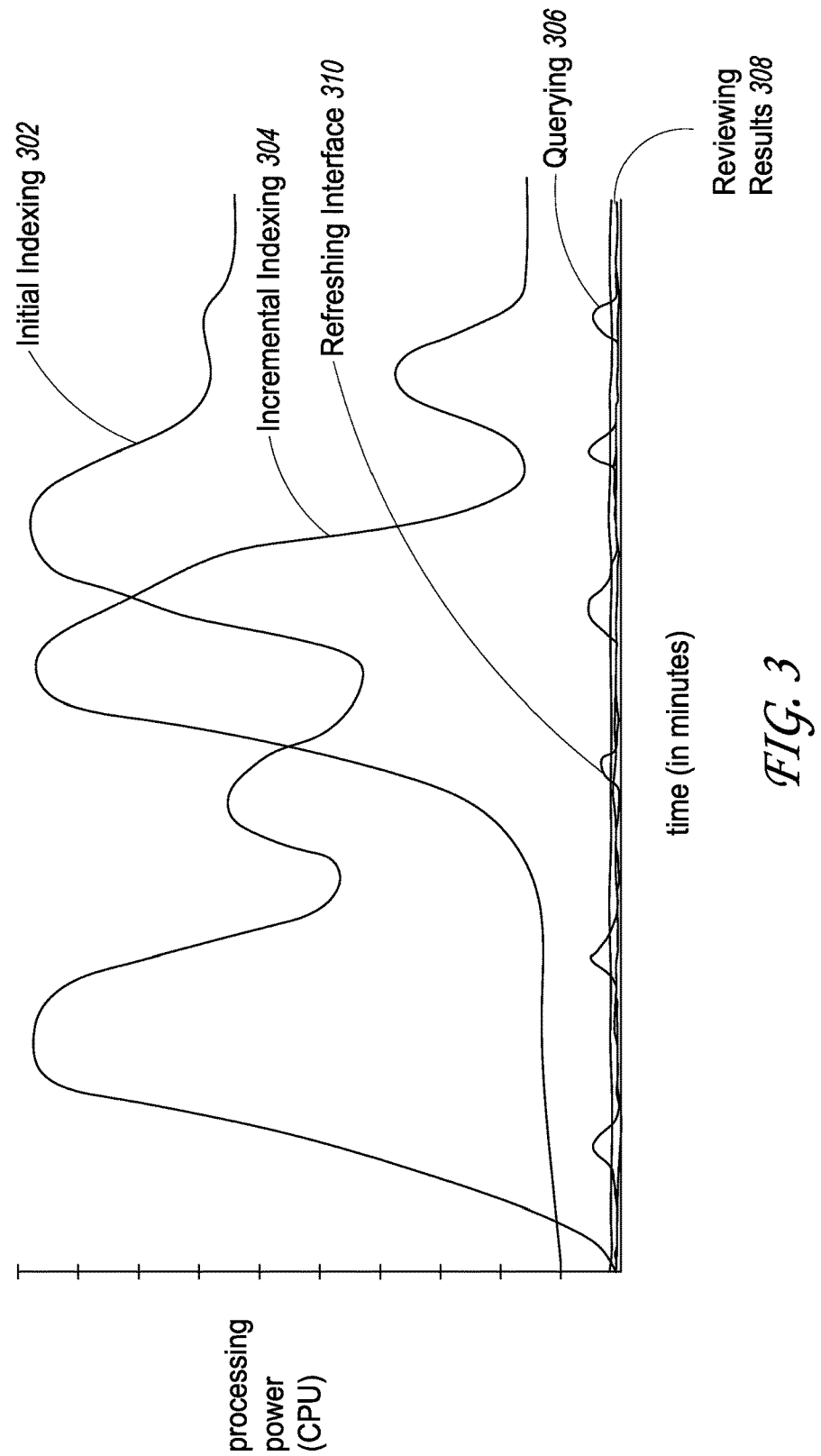
FIGS. 3 and 4 illustrate example indexing resource utilization profiles.

The indexing processes may be utilized for different functions and may have significantly different resource requirements. Examples of such indexing processes may include initial indexing, incremental indexing, querying, reviewing search results, and ongoing refreshing of the user interface (which may display a search user interface including search fields configured to receive search strings and providing search results) for an already-executed query. FIG. 3 illustrates an example of resource usage profiles for initial indexing, incremental indexing, querying, reviewing search results, and ongoing refreshing of the user interface for an already-executed query. It is understood that the example usage profiles are illustrative, and that other usage profiles may be applicable.

An initial indexing operation builds the original, initial index iteration for a user and scans the data to be indexed. The user may specify the data types and/or sources to be indexed. By way of illustrative example, and with reference to indexing resource usage profile 302, initial indexing may take several hours to perform and may use sustained loads 302 of about 50% of a CPU core (depending in part on the CPU processing power), with repeated transient loads of a full CPU core. Memory usage can be significantly higher (e.g., twice as much or more) than needed during steady-state operations.

In particular, an incremental indexing operation scans already indexed user data, identifying items that have changed since the last index was generated, and adding, modifying, and/or deleting records reflecting such changes. By way of example, and with reference to incremental indexing usage profile 304, incremental indexing may, in certain instances, range from about 10% of CPU core processing power when identifying previously indexed items that have not changed, up to CPU core processing power usage similar to that of initial indexing when indexing new or changed items (e.g., up to transient loads of the full CPU core processing power). This operation may, by way of example, take several minutes. It is understood that the percentage of CPU core processing power utilization may depend in part on the processing power of the CPU core, and thus the example utilizations described herein may be different for different systems and CPUs.

A querying operation may involve receiving user search terms, running the search terms against the search index, obtaining matching results for each portion of the overall index, merging the results for the various portions together, and sorting the merged matching results in a default order or in an order specified by the user. The results may be presented to the user via the user's virtual desktop. With reference to querying usage profile 306, the querying process may utilize, by way of example, 5% of the processing power of a CPU core for a time period (e.g., a fraction of a second to a few seconds, depending on the search complexity and index sizes).

A reviewing operation involves processing user navigating through search results, including navigating up or down in a results listing, navigating to new pages of results, or scrolling through the results (e.g., to the middle or end of the result set). With reference to reviewing usage profile 308, the reviewing operation may utilize, by way of example, 1% of the processing power of a CPU core for a time period (e.g., a second), depending on the nature of the user navigation. Certain optional operations performed during a review, such as changing a default sort order, may effectively result in an execution of a new query, with similar processing power utilization.

A user interface refresh operation includes refreshing the results displayed to the user via the user interface, independent of instances when the user requests a refresh. Because the index may be updating at any given moment (e.g., as a result of a modification of a document, an addition of a document, a deletion of a document), the results may be refreshed at a specified interval to ensure the search results are not stale. With reference to refresh usage profile 310, a user interface refresh operation may utilize, by way of example, 1% or 5% of the processing power of a CPU core, depending on whether the index had been updated since the last refresh.

Thus, the computer resource demands of the indexing process can vary significantly. By way of example the CPU usage for an indexing process, may vary from a sustained load of 50% of CPU core processing power, with peaks of 100% of CPU core processing power, all the way down to about 0%-1% of CPU core processing power, with a time averaged load of, by way of example, 10% of CPU core processing power for a typical user. Conventional available technologies with static CPU allocation could allocate a full CPU for this user to satisfy the peak load. While this approach may ensure that there is adequate processing power for peak indexing demands, on the average, about 90% of allocated CPU would be unused, and hence wasted.

Conventional available technologies with static CPU allocation could theoretically allocate 10% of a CPU to indexing operations, but disadvantageously, initial indexing may take more than 10 times longer and could take an extended period of time (e.g., weeks) to finish. Conventional available technologies with dynamic allocation could attempt to allocate the appropriate amount of CPU processing power for indexing operations, but are unable to ensure that sufficient resources will be available if multiple users request a dynamic allocation at the same time. Thus conventional static and dynamic allocations technologies suffer from the shortcoming of leaving a significant quantity of resources idle in case an indexing process might request them at any point in time.

Figure 4:
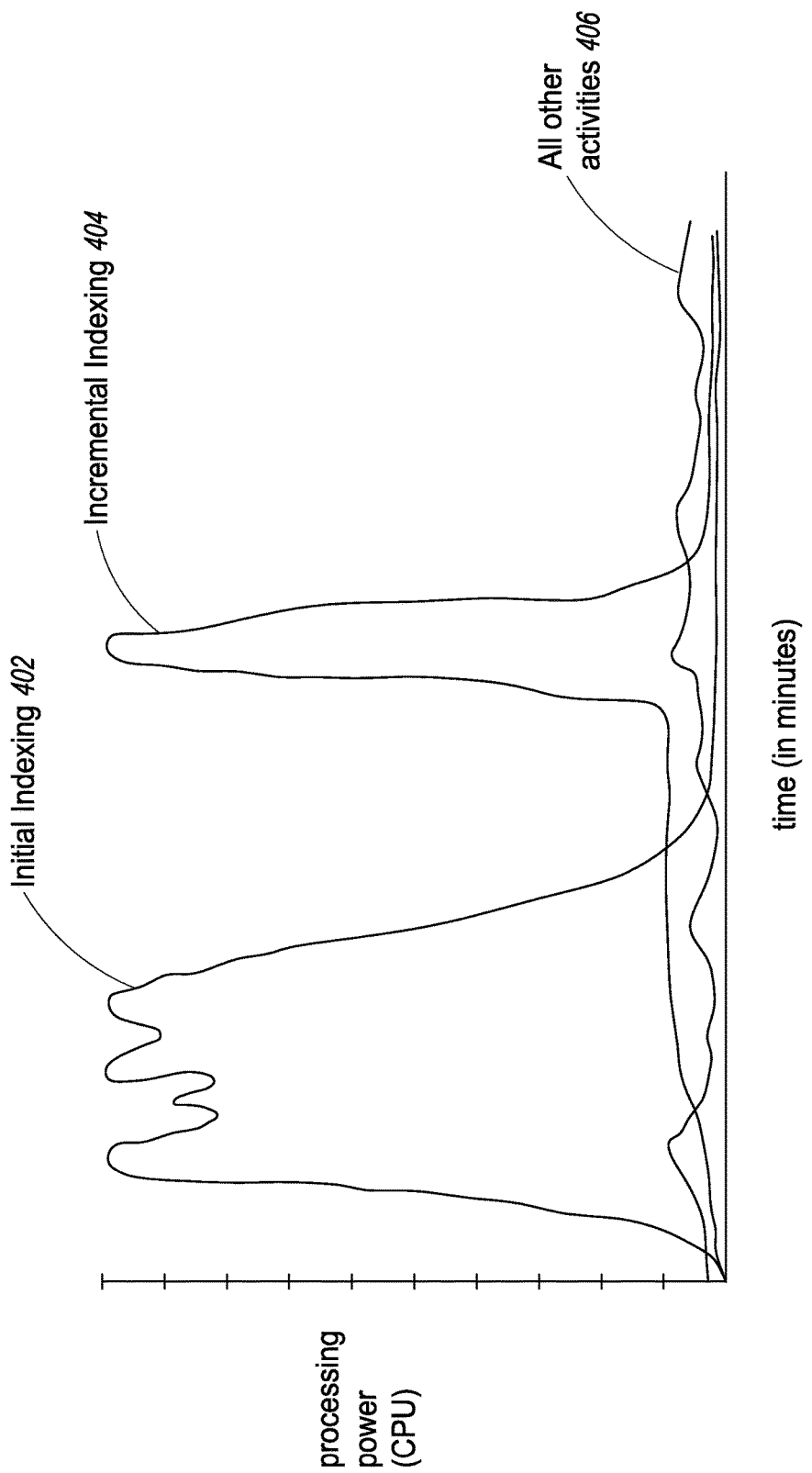

An aspect of the disclosure provides a common resource pool that may be allocated to be shared by multiple indexing processes (e.g., one for each user). FIG. 4 illustrates an example of resource usage patterns over a larger time-span. As the usage patterns across multiple users 402, 404, and 406 is somewhat random, the different usage peaks are naturally spread out and the overall usage of the resources is much more efficient. There are additional optional enhancements, discussed below, that can prevent or inhibit scenarios where peak usage is less random.

Figure 5A:
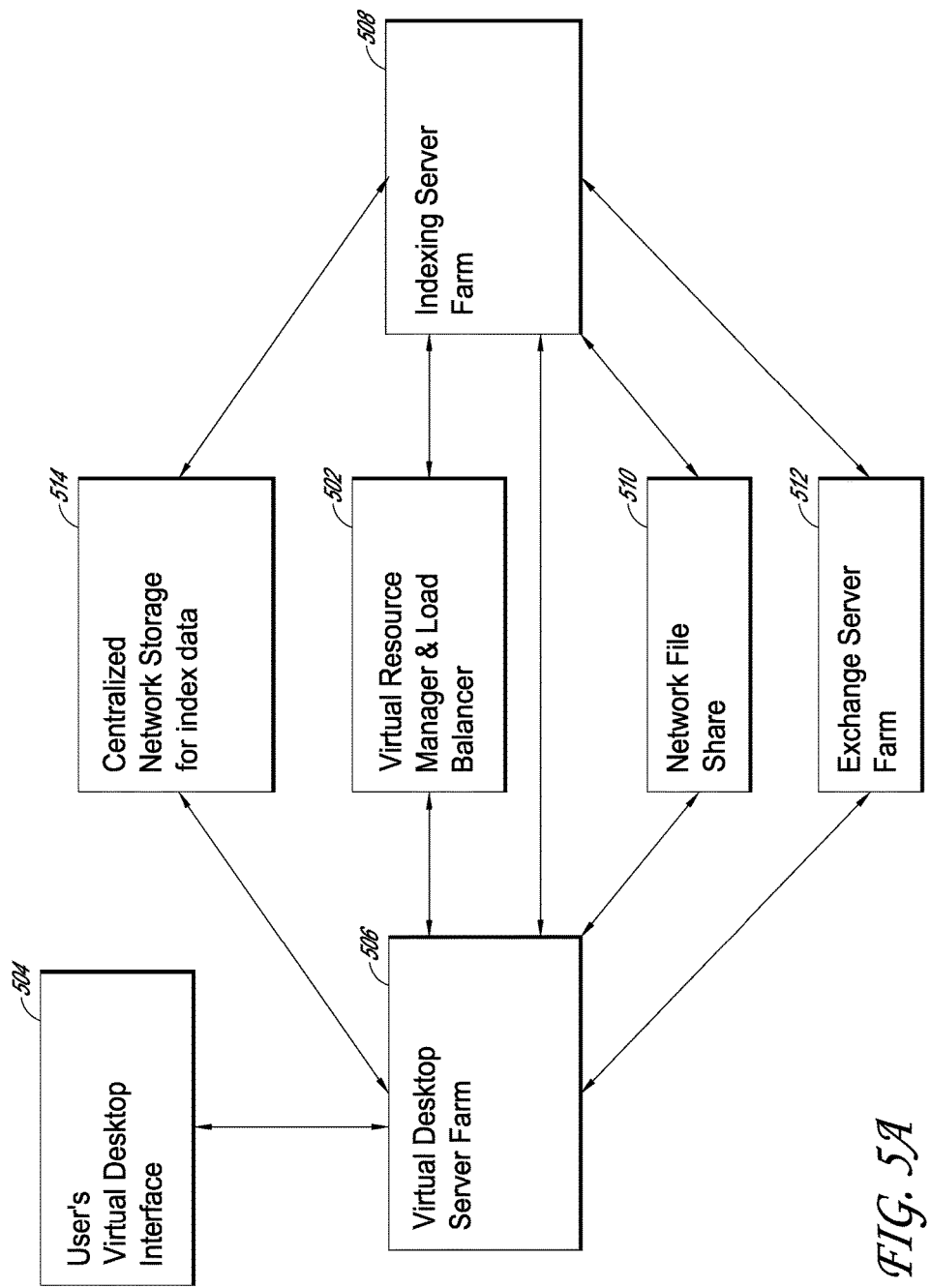
FIG. 5A-5C illustrates an example system environment and certain components thereof.

A Virtual Resource Manager (VRM), such as the VRM 502 illustrated in FIG. 5A, may be provided that may monitor and manage on users' behalf the connection between each user's interface process 504 (operating on the user's individual virtual desktop, wherein the virtual desktop is executing on the virtual desktop server farm 506 comprising one or more host servers), and the indexing process, executing on a shared server. The VRM 502 may be configured to measure various performance parameters, perform statistical analysis, log events, and generate corresponding reports. It is understood, that the term farm, as used herein, may refer to a collection of modules or devices configured to share data with other modules or devices, unless the context indicates otherwise. It is understood, that the term server farm, as used herein, may refer to a collection of servers, unless the context indicates otherwise.

User terminals, such as a thin client (which may include an operating system and may store locally the device specific configuration settings), zero client (which does not require configuration and may provide any local storage or operating system), and/or thick client (which may be a fully functional personal computer or laptop), may be networked to the virtual desktop server farm 506, where the virtual desktop server farm 506 provides the processing power (e.g., for application execution) and the user terminal displays interfaces (e.g., the search user interface, word processing user interfaces, spreadsheet user interfaces, and/or other application user interfaces) and data, and also receives user inputs (e.g., via keyboard, mouse, touch screen, voice commands, or otherwise) which may be communicated to a virtual desktop server.

The VRM 502 may load the user's index and provide updates and query results back to the user's interface process for display via the user's virtual desktop. For larger installations, the VRM 502 may control multiple indexing servers operating as a server farm 508. The various illustrated components may communicate with each other over one or more wired and/or wireless networks and/or device buses (e.g., local area networks, wide area networks, the Internet, USB bus, etc.).

The VRM 502 may use a credential manager, such as Windows Credential Manager for a Windows environment, to store securely passed user credentials from the virtual desktop interface process, create a domain user account on the VRM server that will run the indexing process, ensure access to a network file share 510, and to instantiate the indexing process as that user. The VRM 502 may thus ensure that the indexing process has access to the index belonging to that user and that any updates to the index are performed using that user's data. For the purposes of indexing email data 512 (e.g., Microsoft Exchange email), the indexing process may create an email profile on the server that will be used by the indexing process, to ensure that that server has the ability to create a connection with the email exchange (e.g., a Messaging Application Programming Interface (MAPI) connection with Microsoft Exchange) on behalf of the user. For example, the VRM 502 may utilize Rate Control Protocol (RCP), Transmission Control Protocol (TCP), and port 135 for MAPI communications with a Microsoft Exchange server.

The VRM 502 may also monitor and control throttling settings for some or all of the different indexing processes. The server hardware that provides the indexing processes may have limitations on the number of total user indexing processes that can be run and the number of concurrent data scanning operations that can be done. The VRM 502 may be configured to enable an administrator to input resource optimization values for these throttling settings (e.g., a maximum number of user indexing processes setting, and a maximum number of permitted concurrent data scanning operations). The VRM 502 may then ensure the throttling settings are complied with when performing indexing operations.

With respect to the limit on total processes, the VRM 502 may be configured to detect when a user login would cause the total processes limitation to be exceeded, and optionally notify the user that all resources are currently in use. The user resource request may then queued for newly released resources. When the VRM 502 detects that resources have been released and are sufficient for executing an indexing process, the user may optionally be so informed and the released resources may be used to execute an indexing process for the user.

With respect to the limit on concurrent processes, the VRM 502 may cycle through a list of running indexing processes and provide time-slices to each process thereby enabling each of the processes to execute (e.g., in a round-robin fashion) without attempting to exceed the available resources. By way of example, a given data scan may be performed for email (e.g., Microsoft Exchange email). In a similar fashion, total connections to email servers (e.g., a Microsoft Exchange server or email server farm) can be throttled by the VRM 502. As similarly discussed above, there is a substantial difference in the computational resources needed between conducting an initial index of a user's Exchange data and conducting an incremental index limited to the changes from the last completed indexing operation. Therefore, the VRM 502 may provide separate settings for email (e.g., Exchange email) throttling: a setting that limits the number of connections made by the indexing server or servers conducting an initial indexing and another setting that limits the number of incremental indexing operations made by the indexing server or servers.

Similarly, it may be desirable to throttle other internal or external data sources to prevent indexing processes from excessively loading system resources. By way of example, such data sources may include local data sources (e.g., Microsoft SharePoint, Symantec Enterprise Vault, local data storage, archiving, and electronic document management systems, etc.) or remotely accessed data from Software-as-a-Service (SaaS) cloud storage systems (e.g., offered by providers such as Box, Dropbox, OneDrive, Google Drive, etc.) and Internet Message Access Protocol (IMAP) mail providers (e.g., Gmail, Yahoo, and Outlook.com) that enable users to access email messages stored on a remote mail server via IMAP. In each these examples, different throttle setting interfaces may optionally be provided enabling an administrator or other user to configure throttling separately for initial indexing and for incremental indexing.

Similarly, separate throttling controls may be provided for some or all of the different indexing processes. For example, a setting may be provided to limit the refresh rate of search results displayed via search results user interface. Conventionally, on an installation on a physical machine, the refresh process may be performed more frequently (e.g., more than once a second) because the indexing process has access to available extra CPU cycles provided by the physical machine's CPU. However, in the case of a virtual desktop, to more effectively utilize resources on the server running the indexing processes, the refresh throttling may be used to limit automatic refreshes of the search results to a configurable setting. For example, the refresh setting may be set to every 30 seconds, 1 minute, 5 minutes, or other time period. Optionally, the VRM 502 may be configured to override the refresh throttling setting when certain conditions are detected, such as when the user manually initiates a refresh of the interface, changes search parameters, or re-sorts search results.

The VRM 502 may establish a connection between a configuration of the interface process and the indexing process. Optionally, the interface process and the indexing process establish their own respective connection with a centralized network storage system 514 which, in addition to storing the search index, may store the configuration files for the interface process and the indexing process.

This configuration enables a user to utilize the interface process to modify parameters associated with the indexing process. Examples of indexing parameters may include, but are not limited to, some or all of the following: the file folder paths to index, the email folder paths to index, an indication as whether to index content and/or metadata for a given folder, the frequency with which to re-index a given data type/folder, etc.

The disclosed system enables the user to take post-search actions on search results, automatically handling the cases where the action is performed by the interface process, the indexing process, or performed directly against the data source. Non-limiting examples of actions taken by the interface process include but are not limited to some or all of the following: generating a rich preview of a binary file (e.g., providing a human readable preview of the file), executing an email open command, navigating to an email folder, or opening a new email compose interface. Non-limiting examples of actions taken against the indexing process include some or all of the following: displaying specific metadata, such as last time indexed or status of indexing. Examples of actions taken against the data source include but are not limited to some or all of the following: opening a file, navigating to a file folder, deleting a file, deleting an email, replying to an email, or marking an email as read or unread.

Certain indexing processes will now be discussed in greater detail.

One challenge in creating the initial search index for a user (e.g., an inverted index) is that, depending on the data, it could take hours or days to complete. Until the initial index is completed being built, the index is of limited use to the user. However, there may be many circumstances where the user is unable to keep the virtual desktop user interface running for hours or days at a time. In order to address this challenge, the disclosed VRM is optionally configured to detect when an initial index is being built and to continue executing the indexing process until the initial build of the index is complete, even if the user's virtual desktop is not open or executing.

Optionally, the indexing process can be configured to initiate incremental indexing on a given schedule to thereby ensure that that index is kept substantially up-to-date, without requiring the user to launch his virtual desktop and start the interface process. Thus, the indexing process may be initiated and performed even when the virtual desktop and interface process are not executing. The scheduling of the indexing process may be independent of schedule settings used while the interface process is running. Non-limiting examples of configurable schedule options, which may be displayed to the user via a scheduling user interface, may include some or all of the following: every x minutes, hourly, every x hours, daily at a given time, and weekly at a given time. By way of illustrative example, a user can specify that the indexing process is to be performed every weekday morning at 6 AM to ensure the index is updated substantially immediately prior to the workday.

In some virtual desktop infrastructures there may be hundreds or thousands of users supported over a multitude of servers. To address this challenge the disclosed system optionally enables the collection of users' indexing processes to be spread across multiple servers (e.g., across servers in the indexing server farm 508 illustrated in FIG. 5A). Optionally, the VRM performs load balancing by distributing the indexing processes across multiple servers or a server farm. Depending on which servers are in use at any given time, a given user may be supported on one server during one session and then a second server during the next session, and so on. The VRM is optionally configured to ensure that the proper user credentials, configurations, and profiles are set up on more than one server in a server farm, as needed. The VRM may be configured to utilize the load balancing to enable for failover operation, so that if the VRM detects that one of the load balancing servers has failed, the VRM may cause a backup load balancing server to take control of the server farm. Communication between the centralized storage of user indexes (e.g., the indexing server farm 508) and the virtual server farm (e.g., farm 506) may optionally utilize a direct IP Address connection (e.g., utilizing Uniform Naming Convention (UNC) data access, default TCP port 445). Communication between the virtual server farm (e.g., farm 506) and the VRM (e.g., VRM 502) may optionally utilize MS TCP Port Sharing (default port 808).

The discussions above have, for illustrative purposes, primarily focused on examples of indexing files, email, and unstructured data that are stored on a central network file share. Optionally, the user interface can be connected to a pre-existing index created by a third party system or application. The user interface may be configured to query this third party index using a brokered search request and return the results back for display via the same interface used to display search results from the index created and controlled by the disclosed embodiment.

With references to FIGS. 5B-5C, example components of the VRM 502 will now be discussed in additional detail.

Figure 5B:
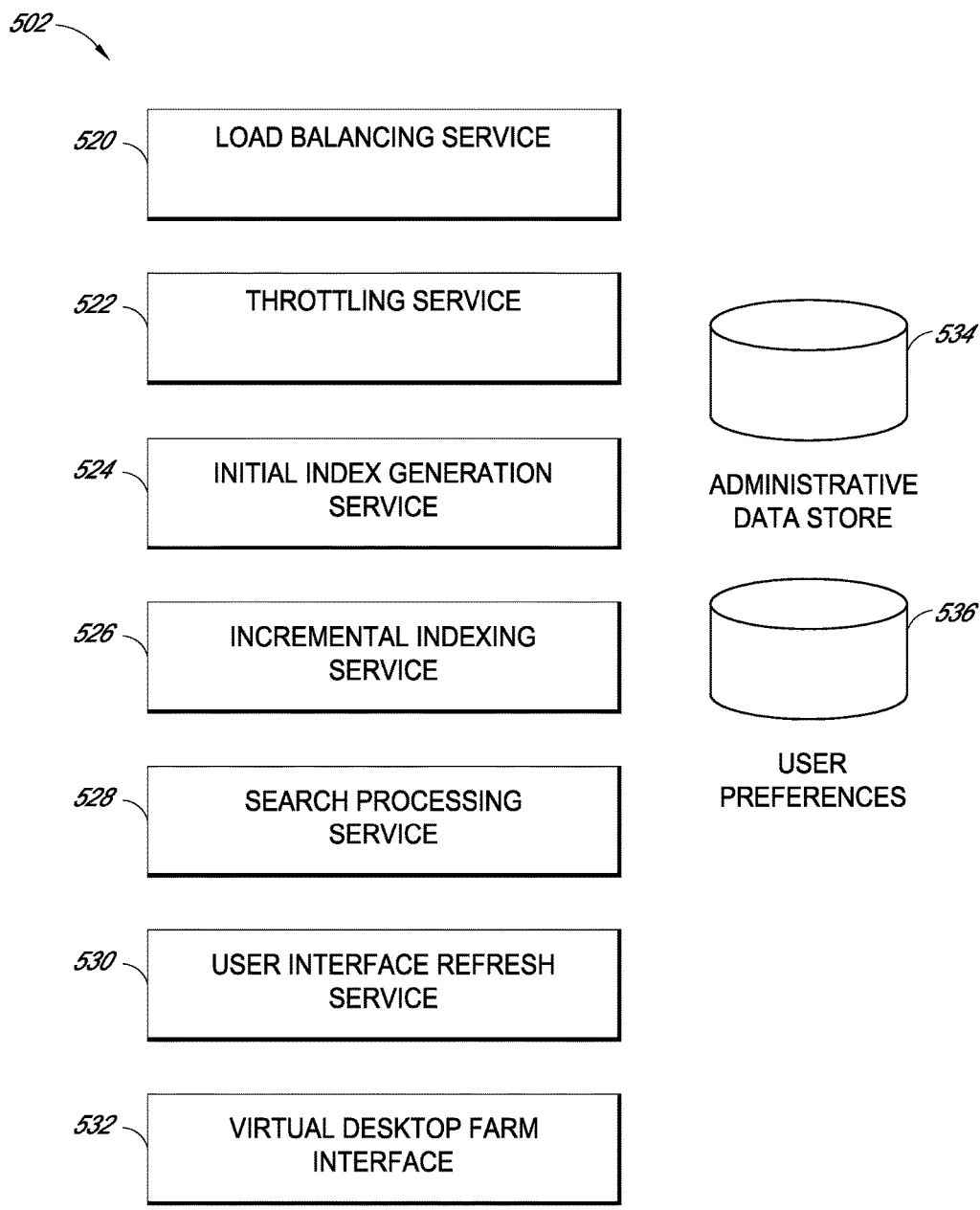

With reference to FIG. 5B, the example Virtual Resource Manager 502 may include some or all of the following service modules: a load balancing service module 520, a throttling service module 522, an initial index generation service module 524, an incremental indexing service module 526, a search processing service module 528, a user interface refresh service module 530, and a virtual desktop farm interface module 532. The foregoing services may be configured to perform the corresponding processes described herein. An administrative data store 534 may be used to store throttling settings and other administrative settings. A user preferences data store 536 may be used to store user preferences with respect to data types, files, and sources to be indexed, an indication as whether to index content and/or metadata for a given data type or source, the frequency with which to re-index a given data type or source, incremental indexing scheduling, and the like.

Figure 5C:
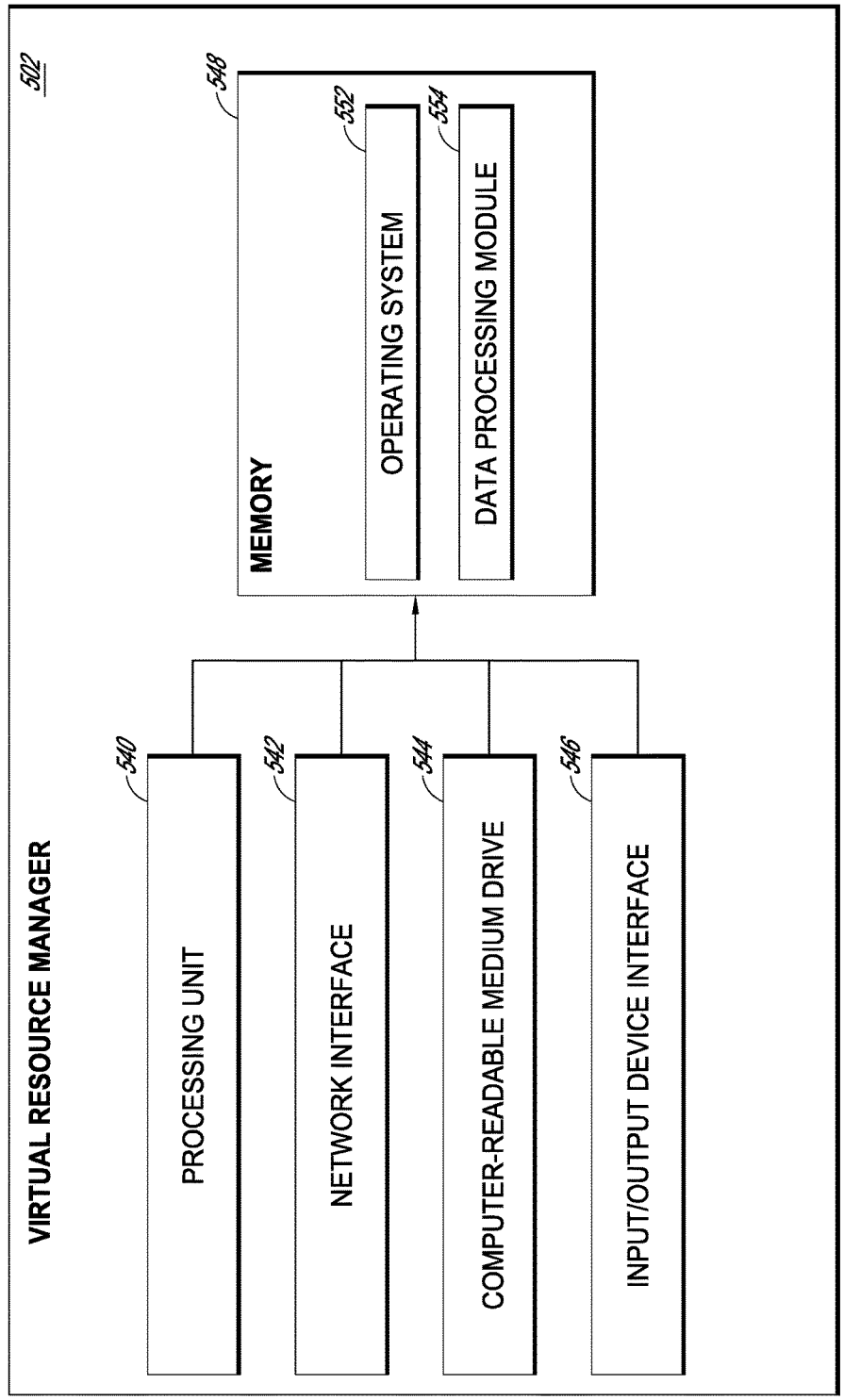

With reference to FIG. 5C, the example Virtual Resource Manager 502 may include one or more servers. A given VRM 502 server may comprise some of all of the following: a processing unit 540, a network interface 542, a non-transitory computer-readable medium drive 544, and an input/output device interface 546. The foregoing components may communicate with one another by way of a communication bus. The network interface 542 may provide the VRM 502 with connectivity to one or more networks (e.g., the networks discussed above with respect to FIG. 5A), and may enable the VRM 502 to communicate with the virtual desktop farm 506, the indexing server farm 508, and other systems and/or components. The processing unit 540 may thus receive information and instructions from other computing devices, systems, or services, such the virtual desktop farm 506, the indexing server farm 508, the centralized network storage system 514, the administrative data store 534, and/or the user preferences data store 536, via one or more networks or component buses. The administrative data store 534 and the user preferences data store 536 may be included in the centralized network storage system 514. The processing unit 540 may also communicate to and from memory 548 and further provide output information via the input/output device interface 546. The input/output device interface 546 may also accept input from various input devices, such as a keyboard, mouse, digital pen, touch screen, etc.

The memory 548 may contain computer program instructions that the processing unit 540 may execute in order to implement one or more embodiments of the present disclosure. The memory 548 may include RAM, ROM and/or other persistent or non-transitory computer-readable storage media. The memory 548 may store an operating system 552 that provides computer program instructions for use by the processing unit 540 in the general administration and operation of the VRM 502. The memory 548 may further include other information for implementing aspects of the present disclosure.

In addition, the memory 548 may include a data processing module 554 that may be executed by the processing unit 540. Optionally, the data processing module 554 implements aspects of the present disclosure. For example, the data processing module 554 can be configured to process user queries, instructions, data and content from the disclosed data stores and systems, etc.

Figure 6:
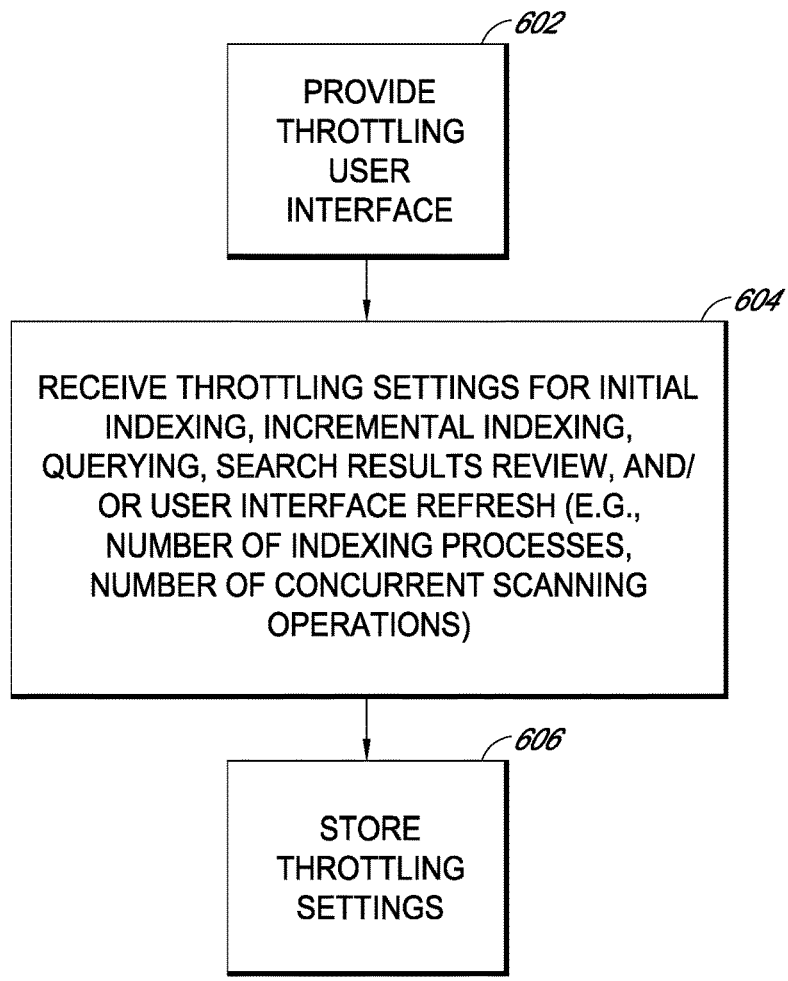
FIGS. 6-10 illustrate example processes.

Certain example processes will now be described with reference to the figures. FIG. 6 illustrates a throttle setup process. At block 602, a throttle user interface is provided to user terminal (e.g., by the VRM). The user may be an administrator. The user may specify throttling settings for initial indexing, incremental indexing, querying, search results review, and/or user interface refresh as similarly discussed elsewhere herein. For example, the throttling setting may include a limit on the number of indexing processes, a limit on the number of concurrent scanning operations, the frequency of user interface refreshes, etc. At block 604, the throttle settings are received from the user via the user interface. At block 606, the threshold settings are stored by the VRM (e.g., in the centralized network storage system 514 or other data store disclosed herein).

Figure 7:
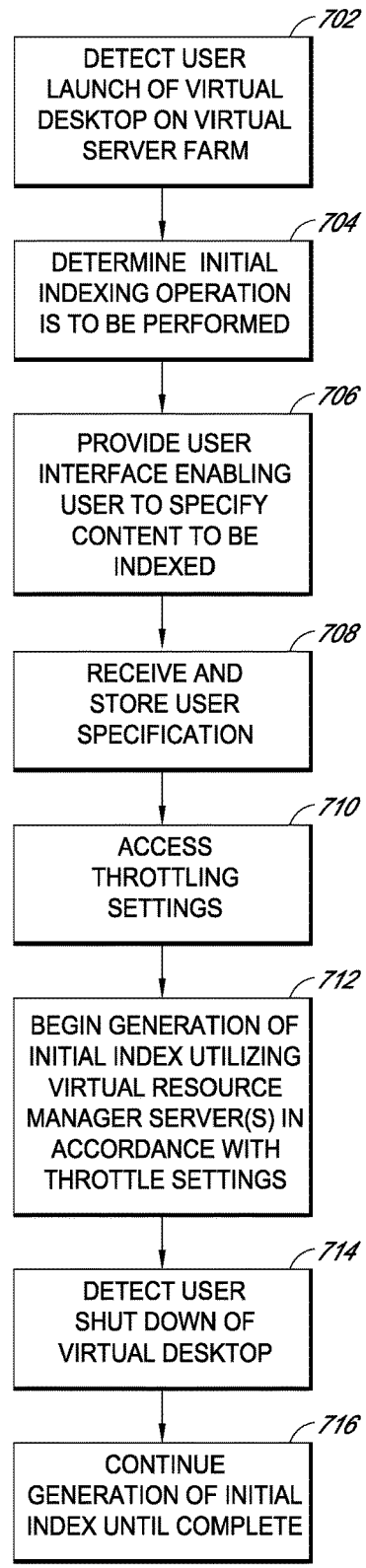

FIG. 7 illustrates an example process of generating an initial iteration of an index. Optionally, at block 702, the VRM detects a user launch of a virtual desktop client (providing the virtual desktop user interface) on a virtual server. The virtual desktop client may contact the VRM to request that an indexing service be assigned to the virtual desktop client. A Group Policy Object (GPO) or other technique that utilizes settings to define what a system will look like and how it will behave for a defined group of users may be utilized to inform the virtual desktop client how to contact the VRM. At block 704, the VRM may determine if an initial indexing operation is to be performed (e.g., based at least in part on determining the absence of an existing index for the user stored on the VRM). At block 706, the VRM provides over a network for display on the user's virtual desktop (which is displayed on a user terminal) a user interface enabling the user to specify content to be indexed. For example, the user interface may enable the user to specify file paths, document types (e.g., email, PDF files, word processing documents, web pages, etc.), etc. At block 708, the user specification of items to be indexed is received and stored.

At block 710, the VRM accesses the throttling settings, if any, from memory (e.g., those throttle settings specified by an administrator as discussed above with respect to FIG. 6 and/or pre-specified default throttle settings). At block 712, the VRM begins generation of the initial index for the user (e.g., an inverted or non-inverted index) utilizing virtual resource manager server(s) in accordance with the throttle settings. At block 714, the VRM optionally detects that the user has shut down the user's virtual desktop (e.g., detects that the user has logged out of the user's virtual desktop). At block 716, the VRM may continue generation of the initial index until the initial index is complete, even when the user's virtual desktop is shutdown. This technique may greatly decrease the period of time it will take to generate the initial index, as unlike conventional indexing systems, the initial index generation continues even when the user is not logged into the virtual desktop. The initial index is stored by the VRM (e.g., in the VRM 502, the indexing server farm 508, or the centralized network storage for index data 514). Optionally a user interface may be provided to terminal (e.g., an administrator terminal), enabling an administrator or other authorized user to prevent the performance of an initial indexing process when the virtual desktop is shut down and the user is logged-off. If the VRM is configured to prevent the performance of an initial indexing process when the virtual desktop is shut down and the user is logged-off, the VRM will accordingly not perform an initial indexing process when the virtual desktop is shut down and the user is logged-off.

Figure 8:
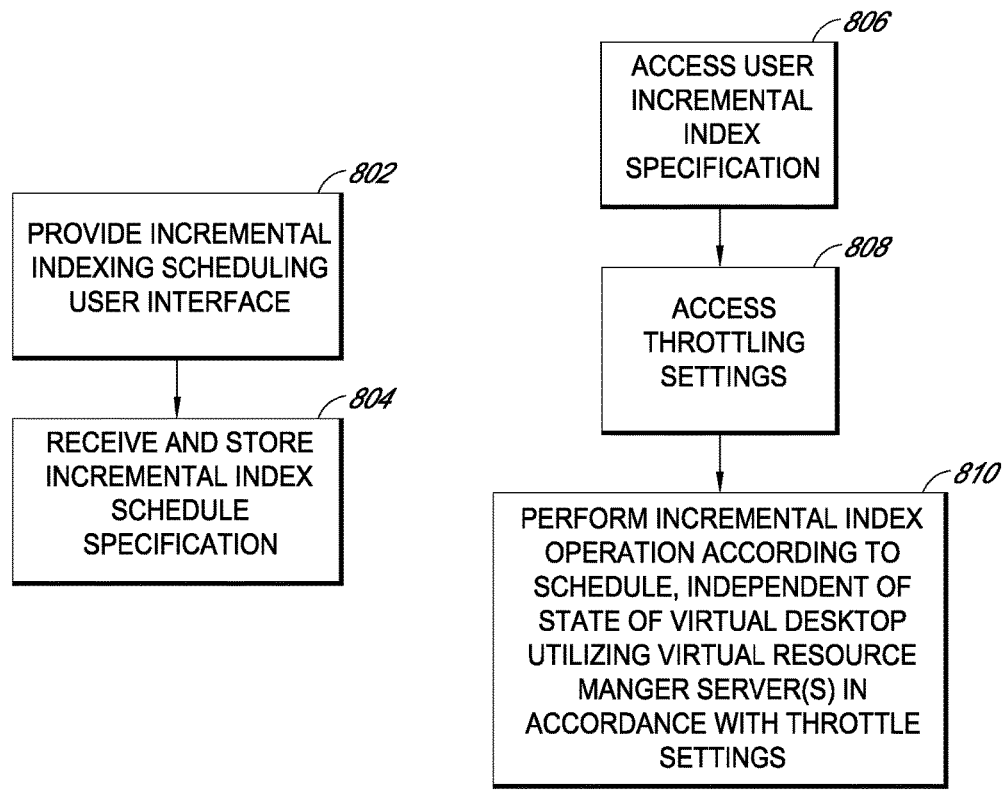

FIG. 8 illustrates an example incremental indexing process and related aspects of a setup process. The incremental indexing process generates updated iterations of an existing iteration of an index. An existing iteration may include a previously generated initial iteration, or a previously generated updated iteration. At block 802, the VRM provides over a network an incremental indexing scheduling user interface for display on the user's virtual desktop (e.g., as part of a search user interface displayed via the virtual desktop on a user terminal). For example, the incremental indexing scheduling user interface may enable the user to specify that the index is to be performed at specified intervals or at specified time(s) of day (e.g., every x minutes, hourly, every x hours, daily at a given time, weekly at a given time, etc.). At block 804, the VRM receives and stores the incremental index schedule specification specified by the user in a data store (e.g., in the centralized network storage system 514). Optionally, if the user has not provided such a specification, a default specification may be used.

At block 806, the VRM accesses the incremental index specification from the data store to determine whether an incremental indexing operation is to be performed. The incremental index operation may also be initiated in response to a manual indexing command from the user. At block 808, the VRM accesses throttling settings (if any), such as those discussed elsewhere herein. At block 810, the VRM performs an incremental indexing operation to generate an updated iteration of the index according to the schedule and throttling settings, optionally independent of the state of the virtual desktop. Thus, the VRM can initiate and perform an incremental indexing operation even when the user is logged off and the user's virtual desktop is not operating, thereby enabling the incremental index operation to be performed during non-working hours if so desired. This may reduce the amount of peak loading on the VRM, as it allows different users' incremental index operations to be spread out over a larger portion of the day, including portions of the day where some or all of the users are not utilizing their virtual desktops or the indexing server farm. Optionally a user interface may be provided to terminal (e.g., an administrator terminal), enabling an administrator or other authorized user to prevent the performance of an incremental indexing process when the virtual desktop is shut down and the user is logged-off. If the VRM is configured to prevent the performance of an incremental indexing process when the virtual desktop is shut down and the user is logged-off, the VRM will accordingly not perform an incremental indexing process when the virtual desktop is shut down and the user is logged-off.

Figure 9:
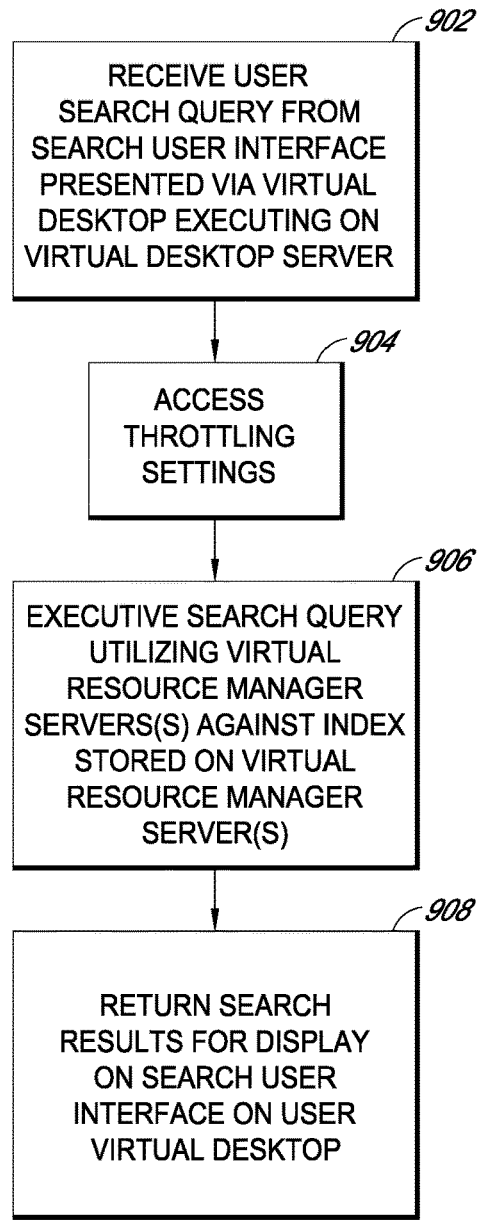

FIG. 9 illustrates an example process for processing a user search query (e.g., a textual search query comprising one or more character strings entered into a search field). At block 902, a user search query is received via a search user interface presented by the user's virtual desktop displayed on a user terminal and executing on virtual desktop server. At block 904, the VRM accesses the throttling settings from memory, if any are present. At block 906, the VRM executes the search query against the user's index (e.g., a reverse index or non-reverse index) stored by the VRM in accordance with the throttling settings. At block 908, the VRM returns over the network the search results for display via the search user interface on the user's virtual desktop, displayed on the user's terminal.

Figure 10:
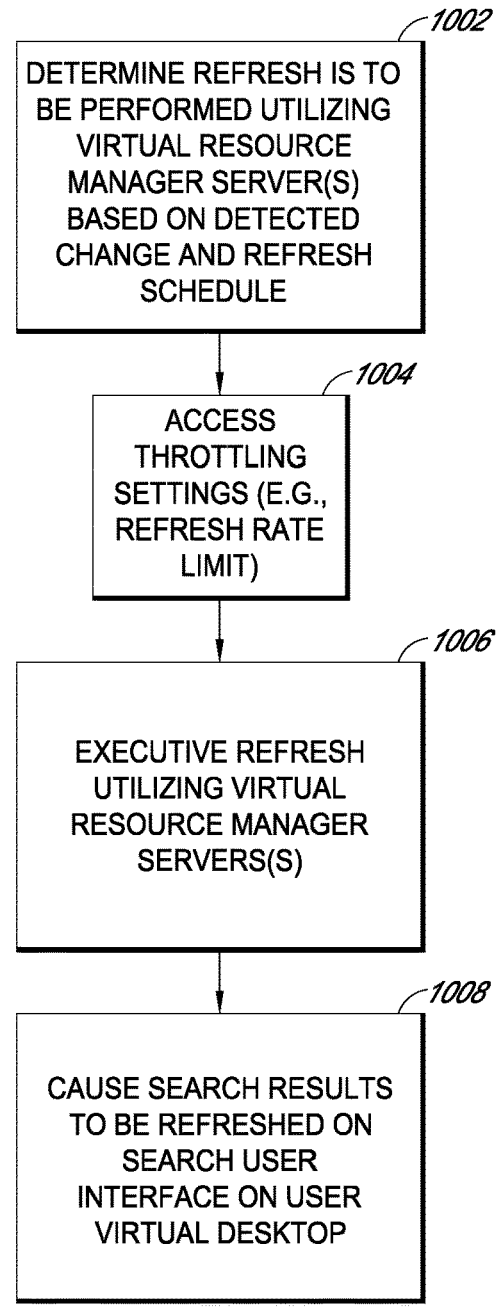

FIG. 10 illustrates an example process for refreshing a search user interface, such as the example interface illustrated in FIG. 17. At block 1002, a determination is made by the VRM as to whether a search user interface is to be refreshed based on a refresh schedule and detection that the search results have changed. Optionally, the refresh operation may be performed in response to a manual refresh command provided by the user. At block 1004, the VRM accesses throttle settings, if any. For example, the throttle settings may specify a refresh rate limit. At block 1006, the VRM refreshes, in accordance with the throttle settings, the search user interface to reflect detected changes in the search results (e.g., as might occur if a document was edited, or a new document (e.g., email) was just indexed, or an existing indexed document was deleted). At block 1008, the VRM causes the search user interface, displayed via the virtual desktop on the user's terminals, to be refreshed.

As noted above, the VRM may be configured to provide centralized management of indexing-related processes, measure various performance parameters, perform statistical analysis, log events, and generate corresponding reports. Certain example user interfaces and reports will now be discussed with respect to the figures. The user interfaces and reports may be generated by the VRM and presented on a user interface terminal, such as that of an administrator. The various reports may be limited to certain time periods (e.g., the previous minute, the previous hour, the previous day, a specified range of time, etc.).

Figure 11:
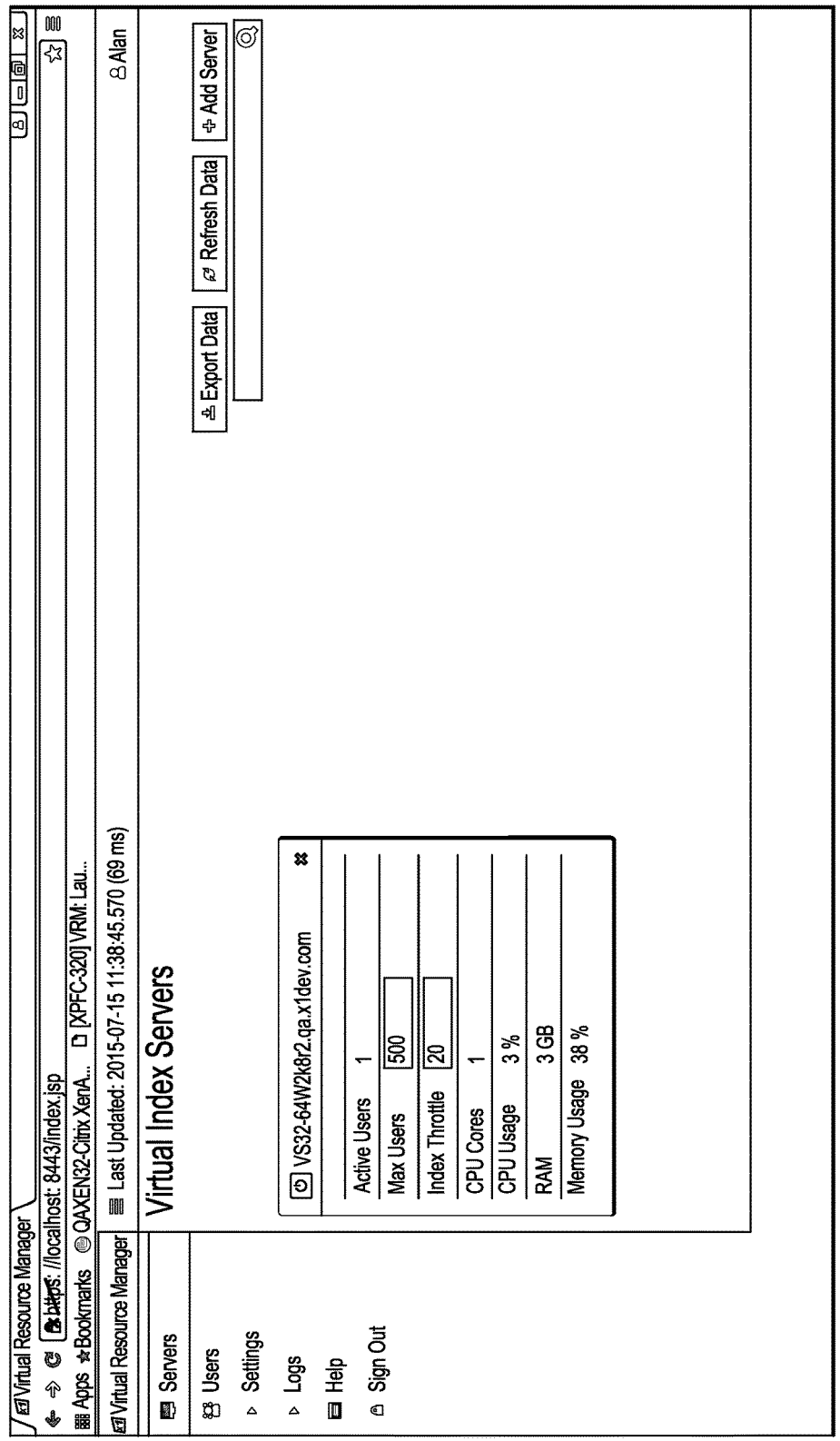

FIG. 11 illustrates an example user interface reporting the current number of active users, the number of CPU cores, the current CPU utilization, the volatile memory size, and the percentage utilization of the volatile memory. In addition, fields are provided via which a user (e.g., an administrator) can specify the maximum number of users and an index throttle that specifies a maximum permissible number of concurrent active indexing processes. The maximum number of users and the index throttle specified by the user may be received, stored, and used to restrict the number of end users and throttle the indexing processes to the maximum permitted number of active indexing processes. Controls are provided via which the user can export data, refresh data, or add a server.

Figure 12:
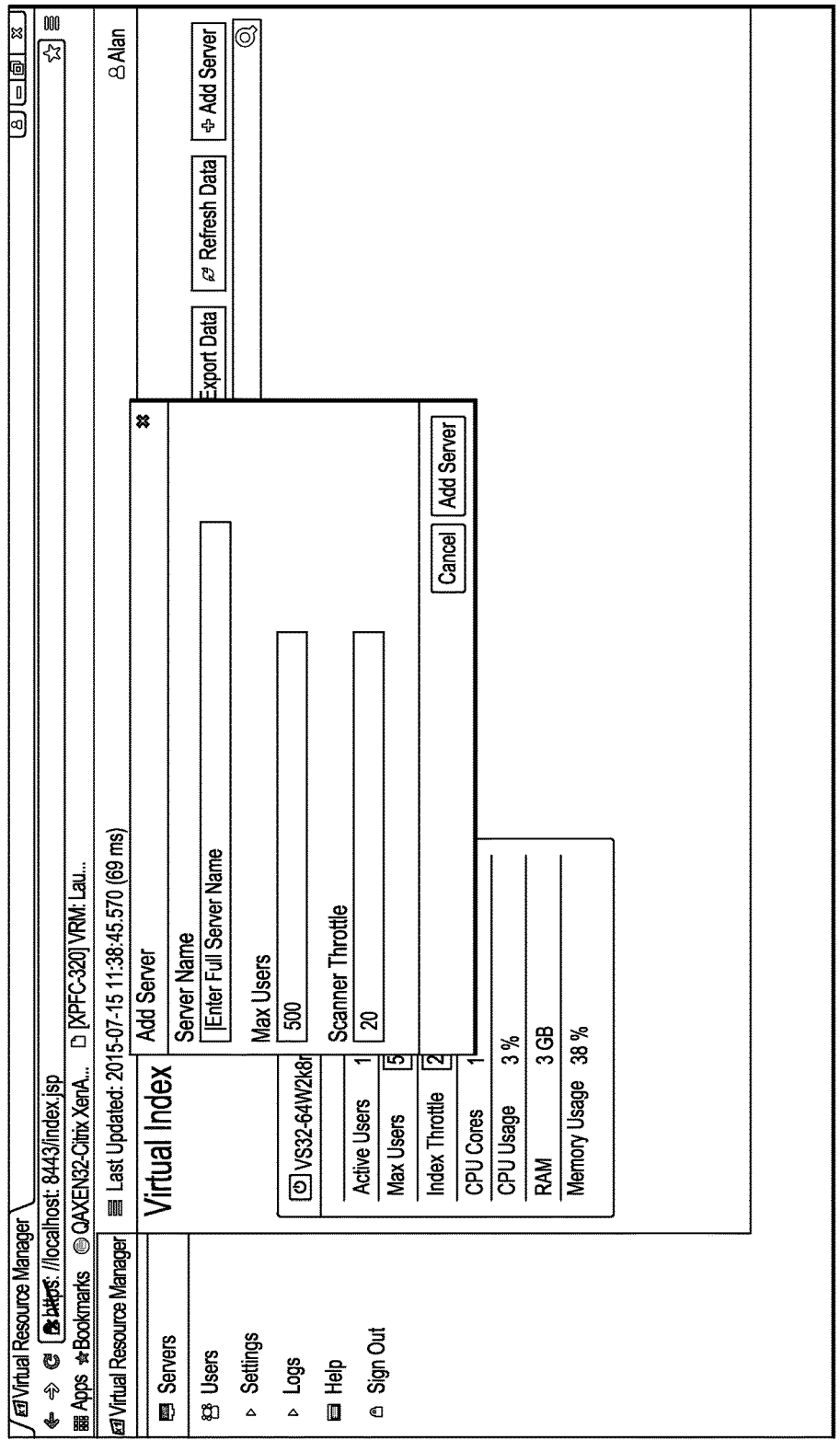

FIG. 12 illustrates an example user interface enabling the user to add a server to the virtual index servers. The user interface may be presented in response to the user activating an "add server" control, such as that illustrated in FIG. 1. Fields are provided via which the user may specify the server name, the maximum number of users, and an index throttle. The maximum number of users and an index throttle specified by the user may be received, stored, and used to restrict the number of users and throttle the indexing process.

Figure 13:
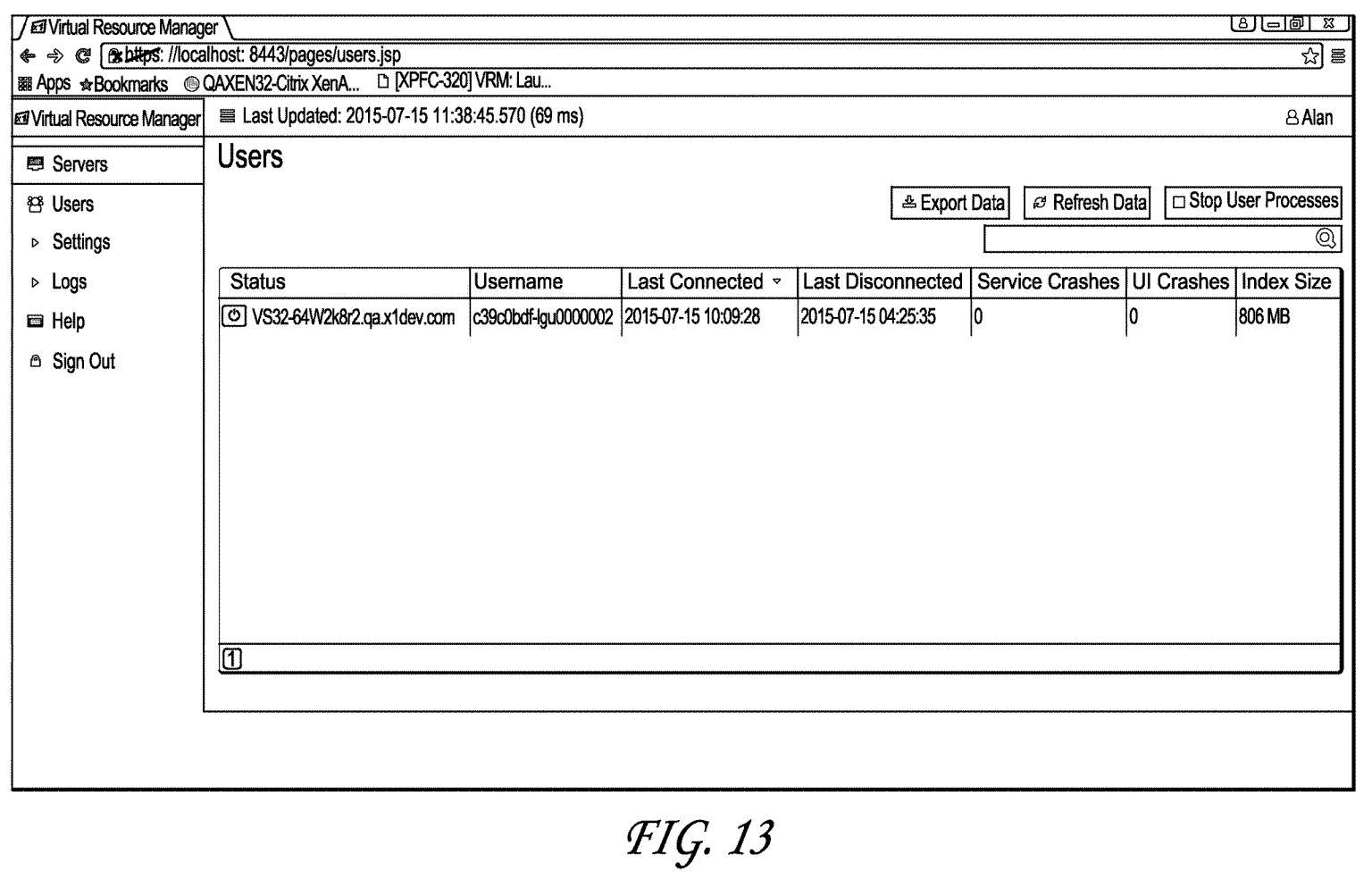

FIG. 13 illustrates an example user interface presenting a user report generated by a VRM based on user and indexing activity. In this example, the user report includes a current status (indicating if the user is logged into to the user's virtual desktop), a user name, an indication as to when the user's virtual desktop was last connected to the virtual resource manager, an indication as to when the user's virtual desktop was last disconnected from the virtual resource manager, number of indexing process crashes, the number of user interface process crashes, and the size of the user's search index.

Figure 14:
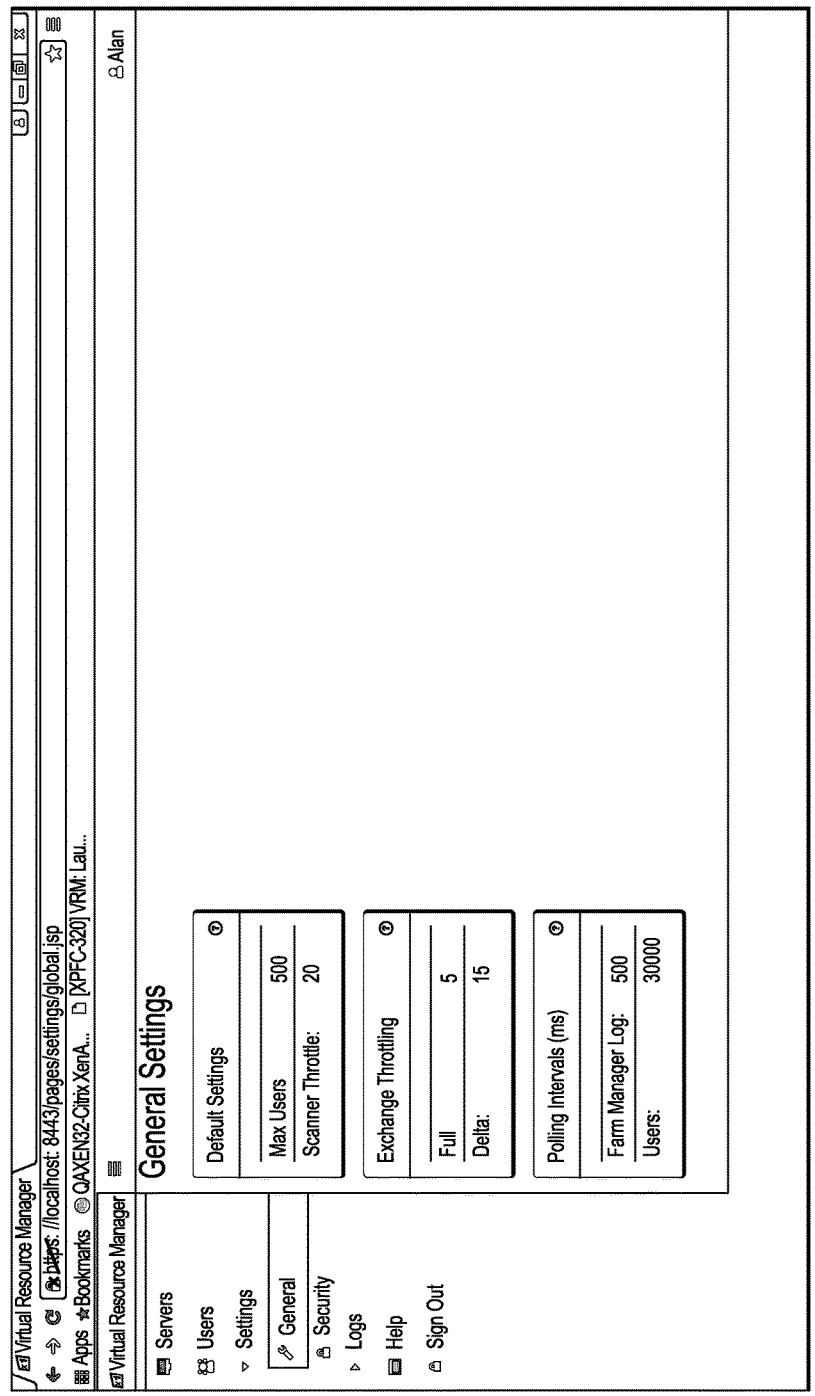

FIG. 14 illustrates another example report generated by the VRM. Fields are provided reporting on the maximum user and scanner throttle default settings, the full and incremental (delta) exchange throttling settings, which can be set to the maximum number of concurrent active indexing processes that can be running at one time (or set to zero if this parameter should not be throttled), and polling intervals settings (in milliseconds) for the farm manager log, and for users, where the polling interval controls how frequently the various services are to be polled for any new log entries.

Figure 15:
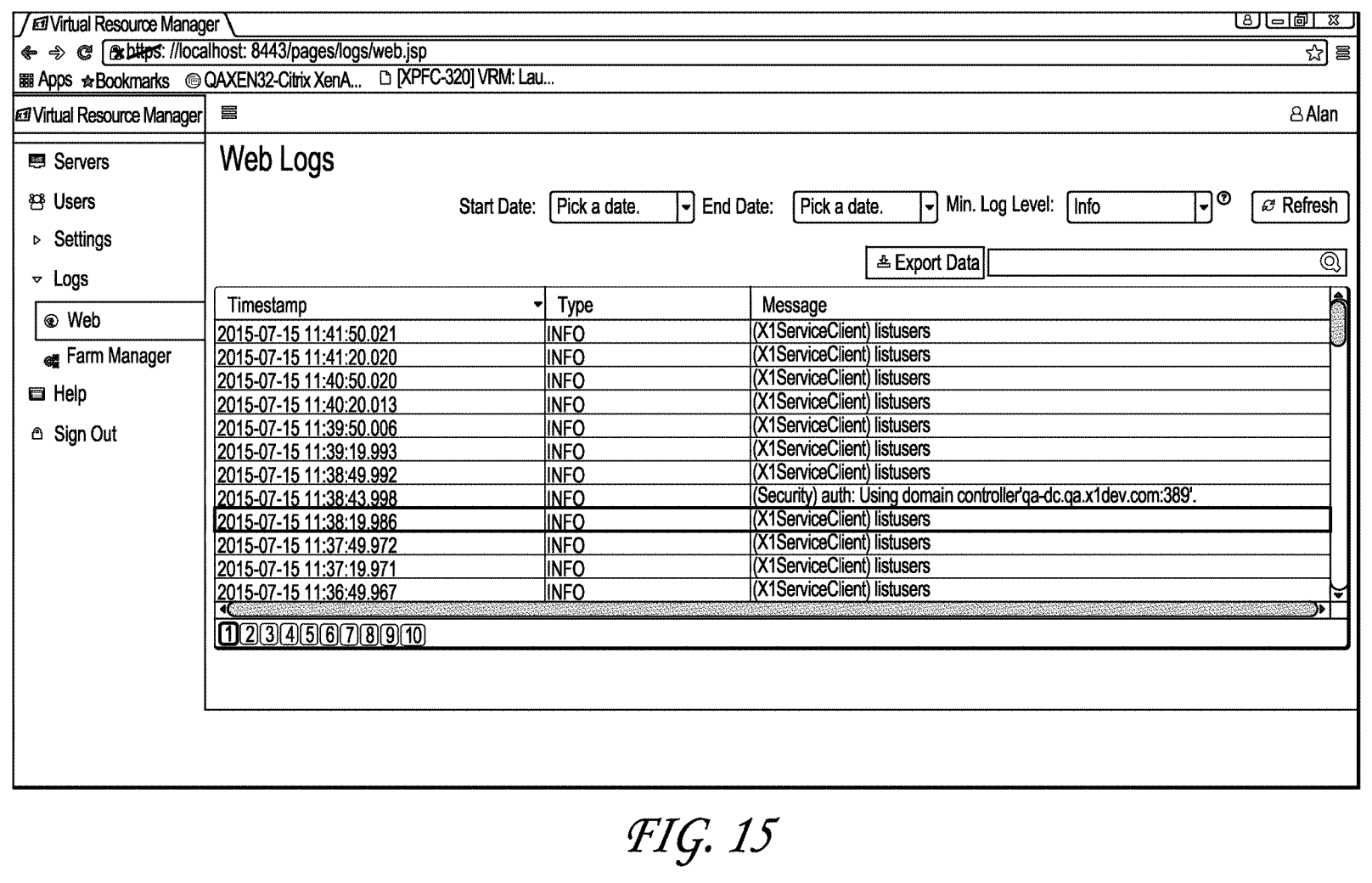

FIG. 15 illustrates an example web log, including a time stamp, type, and message. Fields are provided to enable a range of dates to be selected by a user for the resulting logs, the level of the logs (e.g., from informational messages, to warning messages, to debugging messages), and to enable a user to enter a search term, wherein the system will search the web logs for matches to the search terms and display the matches as search results. The logs may include information such as service status, security information, login attempts, and errors encountered while attempting to complete commands.

Figure 16:
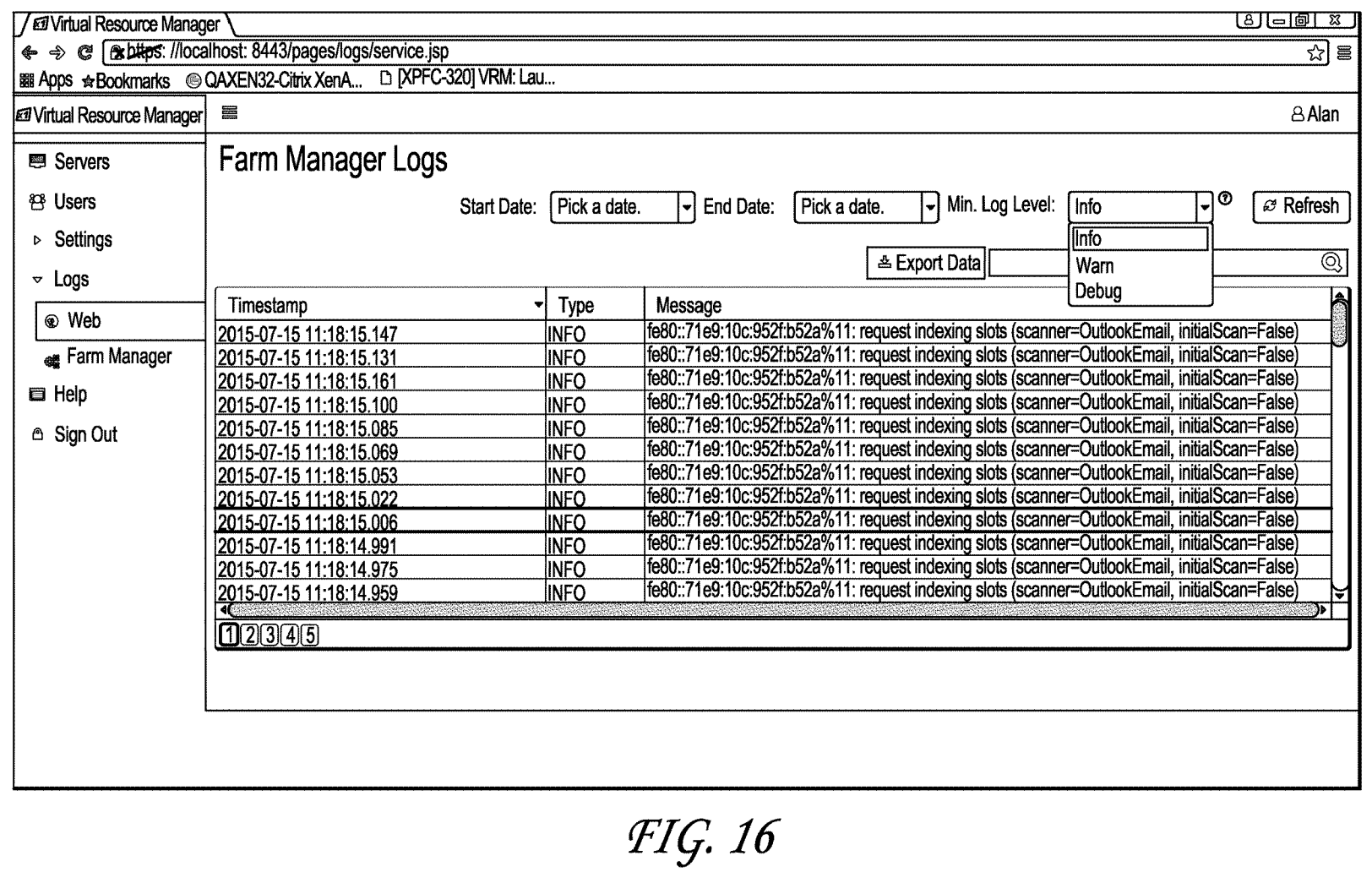

FIG. 16 illustrates an example farm manager log, including a time stamp, type, and message. Fields are provided to enable a range of dates to be selected by a user for the resulting logs, the level of the logs (e.g., from informational messages, to warning messages, to debugging messages), and to enable a user to enter a search term, wherein the system will search the farm manager logs for matches to the search terms and display the matches as search results. The logs may include information such as the status of indexing servers within the indexing server farm, and the status of connections to the domain.

FIG. 17 illustrates an example search user interface that may be displayed via a virtual desktop and which may be provided by and interface with the VRM. The search user interface may include a search field configured to receive one or more character strings, wherein the VRM will receive the character string(s) and identify indexed documents that contain the character string(s) (e.g., in the contents of the document, in the name of the document, in the document type, etc.), as similarly discussed above. The search user interface may optionally include other search fields configured to receive, by way of example, a name search query, a type search query, a date modified search query, a folder name/path search query, an attachment name search query, to and from search queries, etc. The search user interface may enable incremental searching, wherein the search results are updated in about real time as the user enters in additional characters in a search field or as a user deletes characters from a search field.

A source user interface may optionally be provided enabling the user to instruct the VRM to limit search to a particular indexed source (e.g., Outlook mail, Outlook mail inbox, Outlook mail sent box, Outlook contacts, Outlook calendar, Outlook tasks, Outlook Notes, Sharepoint, specific Sharepoint files, all files, specific file folders, etc.). A search result listing may be provided, and a preview of a matching document corresponding to a selected search result listing may optionally be displayed in a preview pane. The search user interface may optionally highlight (e.g., via color, bolding, underlining, or otherwise) content in the preview pane that matches the search query. The search user interface may enable a search result to be acted on (e.g., open a search result, respond to an email, send by email, mark an email as read or unread, delete, move, etc.). Other example search user interfaces may have fewer or additional fields, controls, and/or functionality.

Thus, methods and systems are described for enabling search indexes to be created and updated in a virtual desktop environment while optionally providing an enhanced user experience, reduced virtual resource requirements, and/or centralized management of search indexing processes.

The user terminals described herein may be in the form of a mobile communication device (e.g., a cell phone), laptop, tablet computer, interactive television, game console, media streaming device, head-wearable display, networked watch, etc. They may optionally include displays, user input devices (e.g., touchscreen, keyboard, mouse, voice recognition, etc.), network interfaces, etc.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. The storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, zero client, thin client, thick client, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to generate search indexes, comprising:
    at least one computing device;
    an interface configured to communicate with a virtual desktop farm;
    a non-transitory computer storage medium having stored thereon executable instructions that direct the at least one computing device to implement:
        a load balancing module configured to distribute indexing processes across multiple servers;
        a throttling module configured to inhibit excessively loading system resources by limiting a number of user indexing processes executed by the system and a number of concurrent data scanning operations;
        an initial index generation module configured to generate initial iterations of search indexes for a plurality of users associated with respective virtual desktops, wherein the initial index generation module is configured to:
            determine, for a first user associated with a first virtual desktop executed using the virtual desktop farm, if a search index has been generated for the first user;
            at partly in response to a determination that a search index has not been generated for the first user, begin generation of an initial iteration of a search index for the first user in accordance with the limitation on the number of user indexing processes and with the limitation on the number of concurrent data scanning operations;
            receive an indication that the first user has logged off the first virtual desktop;
            continue generating the initial iteration of the search index associated with the first user while the first virtual desktop executed using the virtual desktop farm is shut down;
            store the initial iteration of the search index associated with the first user on a shared data store that stores search indexes for the plurality of users associated with respective virtual desktops executed using the virtual desktop farm;
        an incremental search indexing module configured to initiate and perform an update to one or more existing iterations of search indexes associated with the plurality of users according to a schedule, including at least an existing iteration of a search index associated with the first user while the first virtual desktop, executed using the virtual desktop farm, is shut down;

a search processing module configured to receive a search query from the first user while the first user is logged into the first virtual desktop, identify, utilizing an iteration of the search index associated with the first user and stored on the server storing search indexes for the plurality of users associated with respective virtual desktops, matching documents, and to cause search results corresponding to the matching documents to be presented via the first virtual desktop.

2. The system as defined in claim 1, further comprising an index server farm configured to interface with a network file share and an email server farm, wherein the system is configured to index documents of the plurality of users stored on the network file share and the email server farm.

3. The system as defined in claim 1, further comprising a user interface refresh module configured to refresh the search results presented via the first virtual desktop with a frequency no greater than a specified maximum.

4. The system as defined in claim 1, wherein the throttling module is further configured to enable a user to specify a first throttling value for an initial indexing operation, and a second throttling value for an incremental indexing operation, wherein the first throttling value is different than the second throttling value.

5. The system as defined in claim 1, wherein the load balancing module is configured to detect if a load balancing server has failed, and in response cause a backup load balancing server to assume tasks of the failed load balancing server.

6. The system as defined in claim 1, wherein the search processing module is configured to run one or more search terms included in the search query received from the first user against the iteration of the search index associated with the first user, obtain matching results from a plurality of portions of the iteration of the search index, merge the matching results for the plurality of portions, and sort the merged results in a default order or in an order specified by the first user.

7. The system as defined in claim 1, wherein the incremental search indexing module is further configured to enable the first user to specify an interval and/or time of day to execute an index update process.

8. The system as defined in claim 1, wherein the system is further configured to provide centralized management of indexing processes for the plurality of users.

9. The system as defined in claim 1, wherein the system is further configured to determine when virtual desktops were last disconnected from the system, how many indexing process crashes have occurred, how many search user interface process crashes have occurred, and sizes of users' respective search indexes stored on the shared data store, and generate and provide one or more reports including the foregoing.

10. A computer-implemented of method of managing search engine indexing with respect to a virtual desktop architecture, the method comprising:

receiving, via a first plurality of virtual desktops executing on a virtual desktop farm, at a virtual resource management system comprising at least a processor device, indexing parameters from a first plurality of users, the indexing parameters identifying data types, or data sources, or both data types and data sources to be indexed;

generating, by the virtual resource management system, initial iterations of search indexes for the first plurality of users associated with respective virtual desktops executing on the virtual desktop farm and utilizing a shared data storage system;

storing the initial iterations of search indexes on the shared data storage system;

generating, by the virtual resource management system, updated iterations of the search indexes on the shared data storage system for at least a portion of the first plurality of users associated with respective virtual desktops, including search indexes of users logged off their respective virtual desktops; and receiving, by the virtual resource management system, a search query from a first user in the first plurality of users, while the first user is logged into a first virtual desktop executing on the virtual desktop farm, and identifying, utilizing an iteration of the search index associated with the first user and stored on the shared data storage system, matching documents, and causing search results corresponding to the matching documents to be presented via the first virtual desktop, wherein the first user is inhibited from accessing initial or updated iterations of indexes of other users stored on the shared data storage system.

11. The method as defined in claim 10, the method further comprising establishing a one-to-one correspondence between a search user interface process running on a given virtual desktop and an indexing process being executed by the virtual resource management system, wherein the virtual resource management system is configured to host a plurality of index processes for a respective plurality of virtual desktops while concurrently maintaining one-to-one correspondences between a given user interface process and the corresponding indexing process.

12. The method as defined in claim 10, the method further comprising refreshing, by the virtual resource management system, the search results presented via the first virtual desktop with a frequency no greater than a specified maximum.

13. The method as defined in claim 10, the method further comprising throttling one or more indexing operations in accordance with a throttling setting.

14. The method as defined in claim 10, wherein at least one initial iteration is generated at least part while an associated virtual desktop is not operating and at least one updated iteration is generated at least part while an associated virtual desktop is not operating.

15. The method as defined in claim 10, the method further comprising balancing indexing loads across multiple servers.

16. The method as defined in claim 10, the method further comprising:

running a search term included in the search query received from the first user against the utilized iteration of the search index associated with the first user stored on the shared data storage system;

accessing matching results from a plurality of portions of the utilized iteration of the search index;

merging the matching results for the plurality of portions;

sorting the merged results in a default order or in an order specified by the first user; and causing the sorted merged search results to be displayed via the first virtual desktop.

17. The method as defined in claim 10, the method further comprising enabling the first user to specify a time of day independent of a state of the first virtual desktop to execute an index update process.

18. The method as defined in claim 10, the method further comprising providing centralized management of indexing processes for the first plurality of users.

19. The method as defined in claim 10, the method further comprising:
   determining when virtual desktops were last disconnected from the virtual resource management system;
   determining how many indexing process crashes have occurred in a first period of time;
   determining how many search user interface process crashes have occurred in the first period of time;
   determining sizes of users' respective search indexes; and
   generating and providing one or more reports including data on:
      when virtual desktops were last disconnected from the virtual resource management system;
      how many indexing process crashes have occurred in the first period of time;
      how many search user interface process crashes have occurred in the first period of time; and
      sizes of users' respective search indexes.

20. A system configured to generate search indexes, comprising:
   at least one computing device;
   an interface configured to communicate with a virtual desktop farm;
   a non-transitory computer storage medium having stored thereon executable instructions that direct the at least one computing device to implement:
      an initial index generation module configured to generate initial iterations of search indexes for a plurality of users associated with respective virtual desktops executing on the virtual desktop farm and store the initial iterations of search indexes on a shared data store;
      an incremental search indexing module configured to update at least some of existing iterations of search indexes associated with the plurality of users according to respective schedules;
      a search processing module configured to receive a search query from a first user while the first user is logged into a first virtual desktop executing on the virtual desktop farm, identify, utilizing an iteration of the search index associated with the first user and stored on the server storing search indexes for the plurality of users associated with respective virtual desktops, matching documents, and to cause search results corresponding to the matching documents to be presented via the first virtual desktop executed using the virtual desktop farm, wherein the first user is inhibited from accessing initial or updated iterations of indexes of other users stored on the shared data store.

21. The method as defined in claim 10, the method further comprising indexing documents of users stored on a cloud storage system.

22. The method as defined in claim 10, the method further comprising indexing documents of users stored on a remote Internet Message Access Protocol email system.

23. The method as defined in claim 10, the method further comprising indexing local data sources.

24. The system as defined in claim 20, the system further configured to index documents of users stored on a cloud storage system.

25. The system as defined in claim 20, the system further configured to index documents of users stored on a remote Internet Message Access Protocol email system.

26. The system as defined in claim 20, the system further configured to index local data sources.

27. The system as defined in claim 20, the system further configured to:
   establish a one-to-one correspondence between a search user interface process running on a given virtual desktop and an indexing process being executed by the system; and
   host a plurality of index processes for a respective plurality of virtual desktops while concurrently maintaining one-to-one correspondences between a given user interface process and the corresponding indexing process.

28. The system as defined in claim 20, the system further configured to refresh the search results presented via the first virtual desktop with a frequency no greater than a specified maximum.

29. The system as defined in claim 20, the system further configured to throttle one or more indexing operations in accordance with a throttling setting.

30. The system as defined in claim 20, wherein at least one initial iteration is generated at least part while an associated virtual desktop is not operating and at least one updated iteration is generated at least part while an associated virtual desktop is not operating.

* * * * *

UNITED STATES PATENT AND TRADEMARK OFFICE
CERTIFICATE OF CORRECTION

PATENT NO. : 10,346,550 B1
APPLICATION NO. : 14/838230
DATED : July 9, 2019
INVENTOR(S) : Brent Botta Page 1 of 1

It is certified that error appears in the above-identified patent and that said Letters Patent is hereby corrected as shown below:

In the Specification

Column 8, Line 13: Change "that that" to --that--.

Column 10, Line 16: Change "that that" to --that--.

In the Claims

Column 19, Line 58: Claim 10, before "method" delete "of".

Signed and Sealed this
Twenty-second Day of October, 2019

Andrei Iancu
*Director of the United States Patent and Trademark Office*